US010372384B2

(12) United States Patent
Liu et al.

(10) Patent No.: US 10,372,384 B2
(45) Date of Patent: Aug. 6, 2019

(54) METHOD AND SYSTEM FOR MANAGING STORAGE SYSTEM USING FIRST AND SECOND COMMUNICATION AREAS

(71) Applicant: EMC IP Holding Company LLC, Hopkinton, MA (US)

(72) Inventors: Yousheng Liu, Beijing (CN); Jamin Jianbin Kang, Beijing (CN); Xinlei Xu, Beijing (CN); Ruiyong Jia, Beijing (CN); Jian Gao, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/630,863

(22) Filed: Jun. 22, 2017

(65) Prior Publication Data

US 2017/0371596 A1 Dec. 28, 2017

(30) Foreign Application Priority Data

Jun. 22, 2016 (CN) .......................... 2016 1 0459343

(51) Int. Cl.
*G06F 3/06* (2006.01)
*G06F 9/52* (2006.01)
(Continued)

(52) U.S. Cl.
CPC .......... *G06F 3/0689* (2013.01); *G06F 3/0614* (2013.01); *G06F 3/0617* (2013.01);
(Continued)

(58) Field of Classification Search
CPC .. G06F 3/0632; G06F 3/0658; G06F 11/2089; G06F 11/2092
See application file for complete search history.

(56) References Cited

U.S. PATENT DOCUMENTS 5,761,705 A * 6/1998 DeKoning .......... G06F 11/1666
711/113
5,790,775 A * 8/1998 Marks ................. G06F 11/1658
714/5.11

(Continued)

OTHER PUBLICATIONS

Patterson et al. "A case for redundant arrays of inexpensive disks (RAID)." Jun. 1988. ACM. SIGMOD '88. pp. 109-116.*

*Primary Examiner* — Nathan Sadler
(74) *Attorney, Agent, or Firm* — BainwoodHuang

(57) ABSTRACT

Embodiments of the present invention provide a method and a system for managing a storage system. In one embodiment of the present invention, there is provided a method for managing a storage system, where the storage system comprises a first controller, a second controller, a first communication area as well as a second communication area. The method comprising: with respect to a storage device in the storage system, in response to the first controller successfully accessing the storage device, writing to the first communication area a first state that indicates a state relationship between the first controller and the storage device, where the first communication area is readable and writable to the first controller and readable to the second controller, reading from the second communication area a second state that indicates a state relationship between the second controller and the storage device, where the second communication area is readable to the first controller and readable and writable to the second controller; and in response to the second state indicating that the second controller successfully accesses the storage device, initializing the storage system. In one embodiment of the present invention, there is further provided a corresponding system and apparatus.

20 Claims, 21 Drawing Sheets

(51) Int. Cl.
*G06F 9/54* (2006.01)
*G06F 11/16* (2006.01)
*G06F 11/20* (2006.01)
*G06F 13/362* (2006.01)

(52) U.S. Cl.
CPC ........ *G06F 3/0632* (2013.01); *G06F 3/0655* (2013.01); *G06F 3/0658* (2013.01); *G06F 9/526* (2013.01); *G06F 9/544* (2013.01); *G06F 11/1662* (2013.01); *G06F 11/2089* (2013.01); *G06F 13/3625* (2013.01)

(56) References Cited

U.S. PATENT DOCUMENTS

| | | | | |
|---|---|---|---|---|
| 6,085,333 A * | 7/2000 | DeKoning | ............... | G05B 9/03 714/6.32 |
| 6,725,331 B1 * | 4/2004 | Kedem | ............... | G06F 11/2094 711/112 |
| 9,405,488 B1 * | 8/2016 | Foley | ................... | G06F 3/0689 |
| 2002/0174377 A1 * | 11/2002 | Davies | ................... | G06F 3/0605 714/6.12 |
| 2002/0188711 A1 * | 12/2002 | Meyer | ................... | G06F 3/0605 709/223 |
| 2003/0200398 A1 * | 10/2003 | Harris | ................... | G06F 3/0601 711/152 |
| 2004/0107305 A1 * | 6/2004 | Bartlett | ............... | G06F 11/2089 710/36 |
| 2004/0117580 A1 * | 6/2004 | Wu | ..................... | G06F 11/2089 711/170 |
| 2005/0132248 A1 * | 6/2005 | Lecrone | ............. | G06F 11/2064 714/6.23 |
| 2005/0154826 A1 * | 7/2005 | Marks | ................... | G06F 3/0607 711/114 |
| 2007/0088917 A1 * | 4/2007 | Ranaweera | ........... | G06F 3/0626 711/148 |
| 2008/0005470 A1 * | 1/2008 | Davies | ................... | G06F 3/0617 711/114 |
| 2013/0159620 A1 * | 6/2013 | Sakashita | ............... | G06F 3/061 711/114 |

* cited by examiner

METHOD AND SYSTEM FOR MANAGING STORAGE SYSTEM USING FIRST AND SECOND COMMUNICATION AREAS

RELATED APPLICATIONS

This application claim priority from Chinese Patent Application Number CN201610459343.3, filed on Jun. 22, 2016 at the State Intellectual Property Office, China, titled "METHOD AND SYSTEM FOR MANAGING STORAGE SYSTEM" the contents of which is herein incorporated by reference in its entirety.

FIELD

Various embodiments of the present invention relate to storage management, and more specifically, to a method and system for managing a storage system (e.g. Redundant Array of Independent Disks, RAID).

BACKGROUND

With the development of data storage techniques, various data storage devices now provide users with stronger data storage capacity, and also their speed of accessing data has been increased greatly. Besides the increase of data storage capacity, users also impose greater demands on data reliability and response time of storage systems. So far various RAID-based data storage systems have been developed to increase data reliability. When one or more disks in a storage system fail, data in failing disks can be recovered from data in other disks operating normally.

The storage system may be accessed via storage control nodes. In a typical active-active type of storage system, two storage control nodes work jointly to process data access operations on the storage system and further provide higher usability and better performance. Each storage control node has its own memory (e.g. cache), and memories in two storage controllers operate in image style. The two storage control nodes may receive in parallel data access instructions from the outside, so such a problem might arise that the two storage control nodes concurrently perform operations to the same storage area. At this point, it becomes a focus of research regarding how to provide a secure and reliable locking mechanism to avoid conflicts between operations of the two storage control nodes.

SUMMARY

Therefore, it is desired to develop and implement a technical solution for managing a storage system and further improving security and stability of the storage system. It is desired that the technical solution can be compatible with existing storage systems and manage them in a more secure and reliable way without any extra hardware devices added to storage systems.

In one embodiment of the present invention, there is provided a method for managing a storage system, which comprises a first controller, a second controller, a first communication area as well as a second communication area, the method comprising: with respect to a storage device in the storage system, in response to the first controller successfully accessing the storage device, writing to the first communication area a first state that indicates a state relationship between the first controller and the storage device, the first communication area being readable and writable to the first controller and readable to the second controller; reading from the second communication area a second state that indicates a state relationship between the second controller and the storage device, the second communication area being readable to the first controller and readable and writable to the second controller; and in response to the second state indicating that the second controller successfully accesses the storage device, initializing the storage system.

In one embodiment of the present invention, there is provided a system for managing a storage system, comprising: one or more processors; a memory coupled to at least one processor of the one or more processors; computer program instructions stored in the memory which, when executed by the at least one processor, cause the system to execute a method for managing a storage system, the method comprising: in a storage system comprising a first controller, a second controller, a first communication area as well as a second communication area, with respect to a storage device in the storage system, in response to the first controller successfully accessing the storage device, writing to the first communication area a first state that indicates a state relationship between the first controller and the storage device, the first communication area being readable and writable to the first controller and readable to the second controller; reading from the second communication area a second state that indicates a state relationship between the second controller and the storage device, the second communication area being readable to the first controller and readable and writable to the second controller; and initializing the storage system in response to the second state indicating that the second controller successfully accesses the storage device.

With the technical solution of the present invention, storage systems can be managed in a more secure and reliable way, and further stability of storage systems may be increased.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
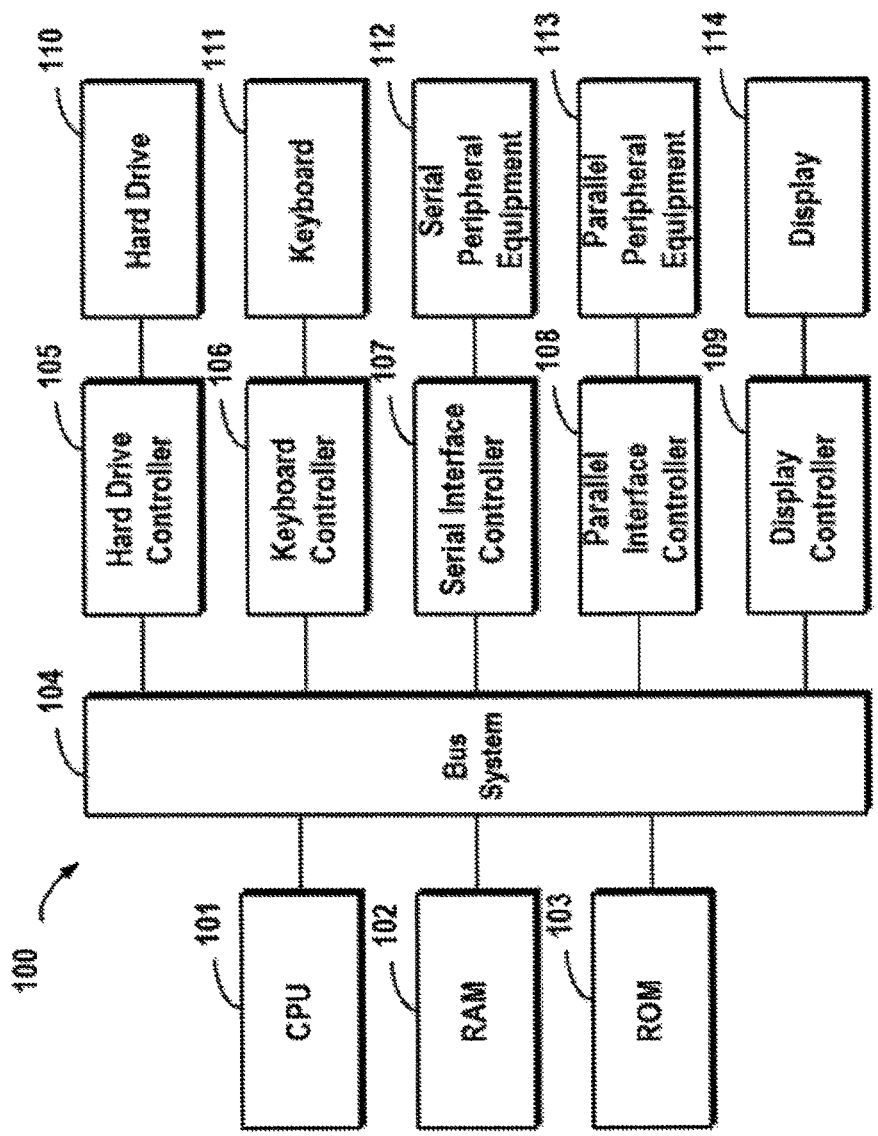
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) may combine multiple storage devices in to an array of disks. By providing redundant storage devices, reliability of an entire disk group is caused to significantly exceed a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc. The operating system may consider a disk array, consisting of multiple storage devices, as a single logical storage unit or disk. By partitioning the disk array into multiple stripes, data may be distributed across multiple storage devices, so that low delay and high bandwidth is achieved, and data can be recovered to some extent when some disks are broken.

Figure 2A:
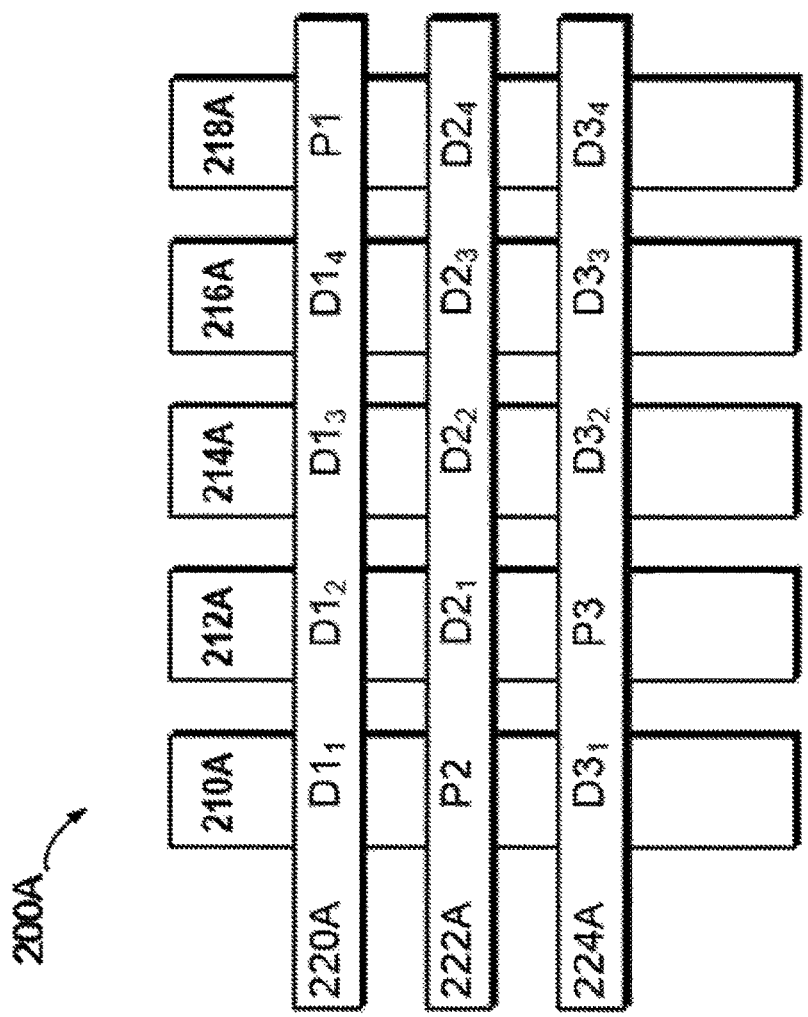
FIG. 2A schematically illustrates a schematic view of a structure of a Redundant Array of Independent Disks according to one technical solution, and FIG. 2B schematically illustrates a schematic view of rebuilding process of a Redundant Array of Independent Disks according to one technical solution.

FIG. 2A schematically illustrates a schematic view 200A of a structure of RAID according to one technical solution. In this figure, working principles of RAID are illustrated by taking RAID-5 that consists of five independent storage devices (210A, 212A, 214A, 216A and 218A) as an example. It should be noted although in FIG. 2A there are schematically shown five storage devices, in other embodiments more or less storage devices may be comprised according to different versions of RAID. Moreover, although in FIG. 2A there are shown stripes 220A, 222A and 224A, in other examples the RAID system may further comprise different numbers of stripes.

In RAID, a stripe crosses multiple physical storage devices (for example, the stripe 220A crosses the storage devices 210A, 212A, 214A, 216A and 218A). The stripe may be construed as a storage area among multiple storage devices which satisfies a given address range. Data stored in the stripe 220A comprises multiple parts: a data block $D1_1$ stored in storage device 210A, a data block $D1_2$ stored in the storage device 212A, a data block $D1_3$ stored in the storage device 214A, a data block $D1_4$ stored in the storage device 216A, and a data block P1 stored in the storage device 218A. In this example, the data blocks $D1_1$, $D1_2$, $D1_3$ and $D1_4$ are stored data, and the data block P1 is the parity of the stored data.

The mode of storing data in other stripes is similar to that in the stripe 220A, and the difference is that the parity about other data block may be stored in other storage device that storage device 218A. In this way, when one of the multiple storage devices 210A, 212A, 214A, 216A and 218A fails, data in the failing device may be recovered from other normal storage devices.

Figure 2B:
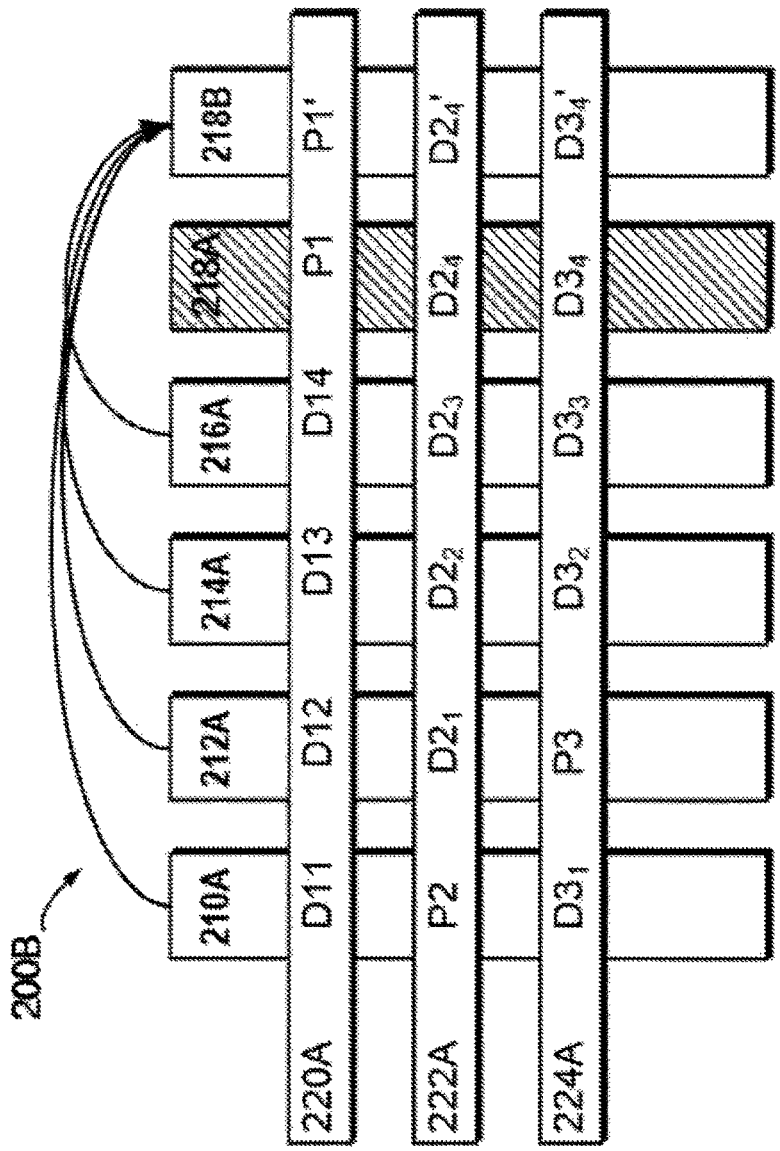

FIG. 2B schematically illustrates a schematic view 200B of rebuilding process of RAID. As shown in FIG. 2B, when one storage device (e.g. the storage device 218A shown in shadow) fails, data may be recovered from other storage devices 210A, 212A, 214A and 216A operating normally. At this point, a new backup storage device 218B may be added to RAID to replace storage device 218A. In this way, recovered data may be written to 218B, and system rebuilding may be realized.

Figure 3:
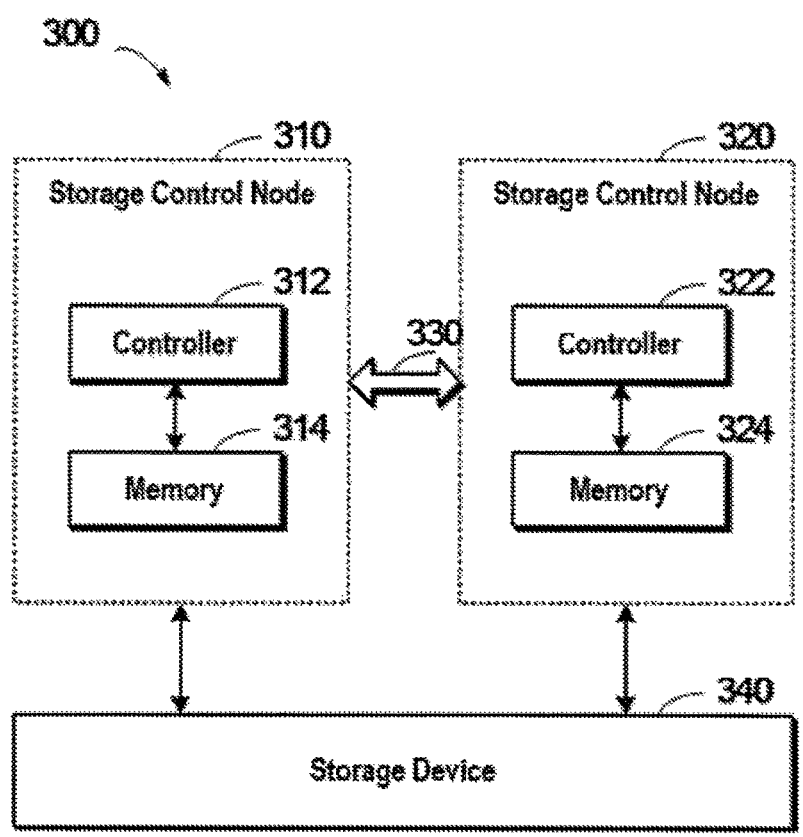
FIG. 3 schematically illustrates a schematic view of a method for managing a storage system according to one technical solution.

FIG. 3 schematically illustrates a schematic view of a method for managing memories in a storage system 300 according to one technical solution. As shown in FIG. 3, the storage system 300 may provide data access service to the outside via one or more storage control nodes. In this example, storage system 300 may comprise storage control nodes 310 and 320. During operation of storage system 300, two storage control nodes 310 and 320 may provide service to the outside in parallel. If one node fails, then the other node may continue working.

Storage control node 310 may comprise a controller 312 and a memory 314 (e.g. cache). When the storage control node 310 receives an access request (e.g. read-write request) from an external host, the controller 312 processes the request. Similarly, another storage control node 320 comprises a controller 322 and a corresponding memory 324, and operates in a similar manner as that of storage control node 310. The two storage control nodes 310, 320 may operate in parallel for processing different access requests with respect to the storage device 340.

In order to ensure data consistency in the storage system during operation, an internal communication channel 330 is arranged in the storage system, for transferring messages between two storage control nodes 310 and 320. Once internal communication channel 330 fails, however, communication between two storage control nodes 310 and 320 becomes unavailable. During the creation, initialization, data access requests processing as well as rebuilding of storage system 300, failures of the internal communication channel 330 will lead to chaos in storage system 300.

So far there have been proposed a variety of technical solutions in order to manage a storage system consisting of two storage control nodes. In one technical solution, a more independent reliable communication channel is extra added to support communication between two storage control nodes. However, this technical solution will lead to extra communication overheads, which does not help to increase data response efficiency of the storage system. In another technical solution, a third party is arranged to manage the two storage control nodes. Therefore, it becomes a focus of research regarding how to manage the storage system in a more robust, secure and reliable manner.

In view of disadvantages in the foregoing technical solutions, one embodiment of the present invention provides a method for managing a storage system. The storage system comprises a first controller, a second controller, a first communication area as well as a second communication area. The method comprises: for a storage device in the storage system, in response to the first controller successfully accessing the storage device, writing to the first communication area a first state that indicates a state relationship between the first controller and the storage device, where the first communication area is readable and writable to the first controller and readable to the second controller; reading from the second communication area a second state that indicates a state relationship between the second controller and the storage device, where the second communication area is readable to the first controller and readable and writable to the second controller; and in response to the second state indicating that the second controller successfully accesses the storage device, initializing the storage system.

Figure 4:
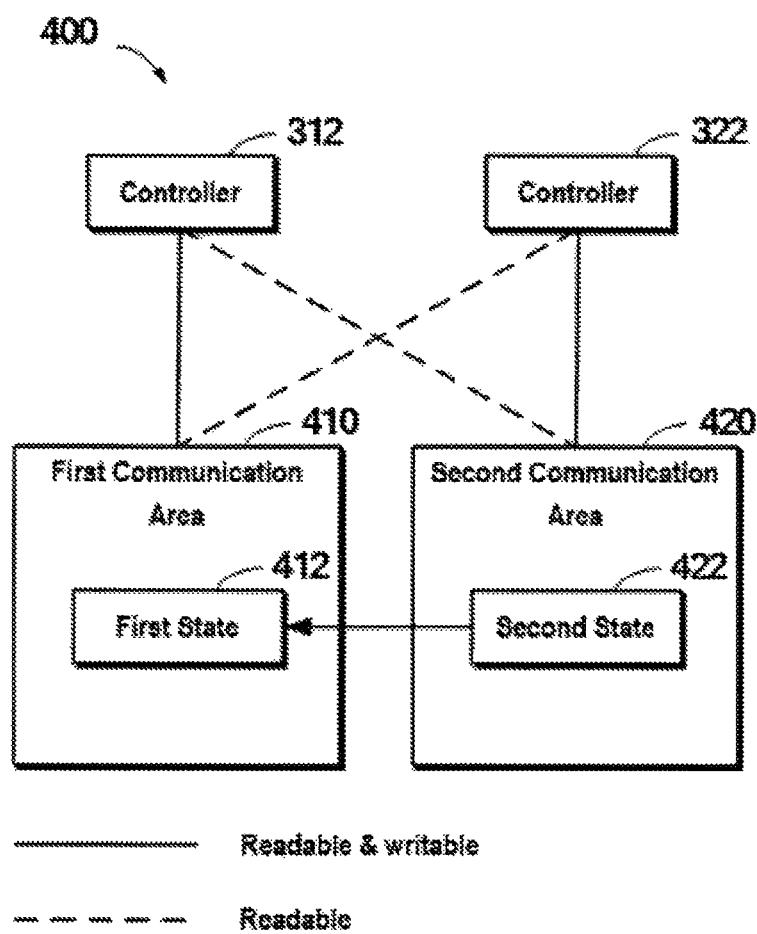
FIG. 4 schematically illustrates an architecture view of a technical solution for managing a storage system according to one embodiment of the present invention.

FIG. 4 schematically shows an architecture view 400 of a technical solution for managing a storage system according to one embodiment of the present invention. As shown in FIG. 4, the storage system comprises two controllers, namely controller 312 and controller 322. Moreover, two communication areas are arranged in the storage system, namely a first communication area 410 and a second communication area 420. The two communication areas are accessible by the both controllers 312 and 322, with difference in access permission. Readable and writable access permission is shown in solid lines; for example, the first communication area 410 is readable and writable to the controller 312, and the second communication area 420 is readable and writable to the controller 322. Readable access permission is shown in dashed lines; for example, the second communication area 420 is readable to controller 312, and the first communication area 410 is readable to the controller 322.

As shown in FIG. 4, by arranging in the storage system the first and second communication areas which have different access permission to the two controllers, messages are delivered via the two communication areas and thus the storage system is managed. Further, the need to build an extra communication channel between the two controllers is avoided. During the storage system's operations, the controller 312 and the controller 322 may write their own state information to the first communication area and the second communication area, for the other controller to read and perform corresponding operation. For example, the controller 312 may write its own state (the first state 412) to the first communication area 410 that is readable and writable to itself, and at the same time, the controller 312 may read a state (the second state 422) about the controller 322 from the second communication area that is readable to itself, so as to determine next operation.

Figure 5:
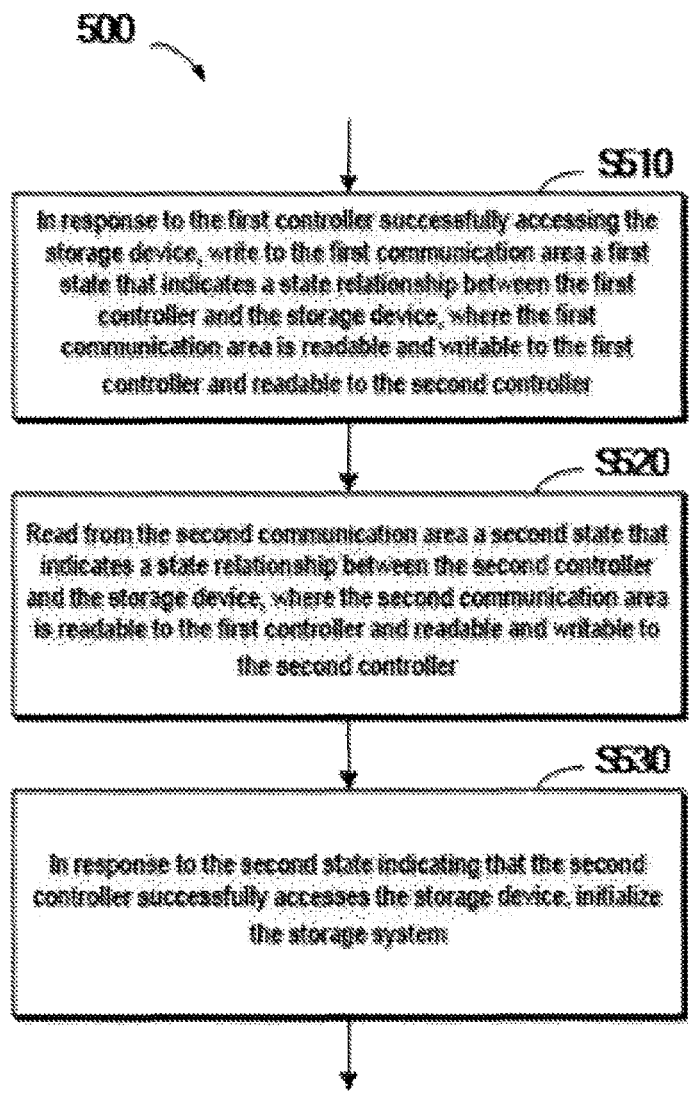
FIG. 5 schematically illustrates a flowchart of a method for managing a storage system according to one embodiment of the present invention.

With reference to FIG. 5, detailed description is presented below to the concrete process of a method according to one embodiment of the present invention. FIG. 5 schematically shows a flowchart 500 of a method for managing a storage system according to one embodiment of the present invention. Note FIG. 5 merely illustrates an example of operations performed at one storage device in the storage system. Those skilled in the art may appreciate when there are a plurality of storage devices in the storage system, the method shown in FIG. 5 may be performed at each of the plurality of devices. In this embodiment, the first communication area and the second communication area may be deployed at the storage device.

In step S510, in response to the first controller successfully accessing the storage device, a first state that indicates a state relationship between the first controller and the storage device is written to the first communication area, where the first communication area is readable and writable to the first controller and is readable to the second controller. In this embodiment, in response to the first controller successfully accessing the storage device, the first state may be set as "prepared."

In step S520, a second state that indicates a state relationship between the second controller and the storage device is read from the second communication area, where the second communication area is readable to the first controller and is readable and writable to the second controller. Like content of the first state, the second state is information which is written by the second controller to the second communication area and which indicates a state relationship between the second controller and the storage device. For example, when the second controller has established an access connection with the storage device and waits for subsequent operation, the second state may be "prepared."

In step S530, in response to the second state indicating the second controller successfully accesses the storage device, the storage system is initialized. In this step, when the second state is "prepared," an operational flow may be started to initialize the storage system. Note in this embodiment, the first controller and the second controller may operate independently; for example, the two controllers may reach the "prepared" state concurrently or successively. The initialization operation is started in response to both states being "prepared;" if one has not gotten "prepared," then the storage system has to wait.

In order to prevent the storage system from waiting long, a wait timeout period may be set using a timer. Specifically, in one embodiment of the present invention, there is further comprised: in response to the first controller successfully initializing the storage system, setting a first heartbeat timer in the first communication area; before the first heartbeat expiring, periodically reading the second state from the second communication area.

Figure 6:
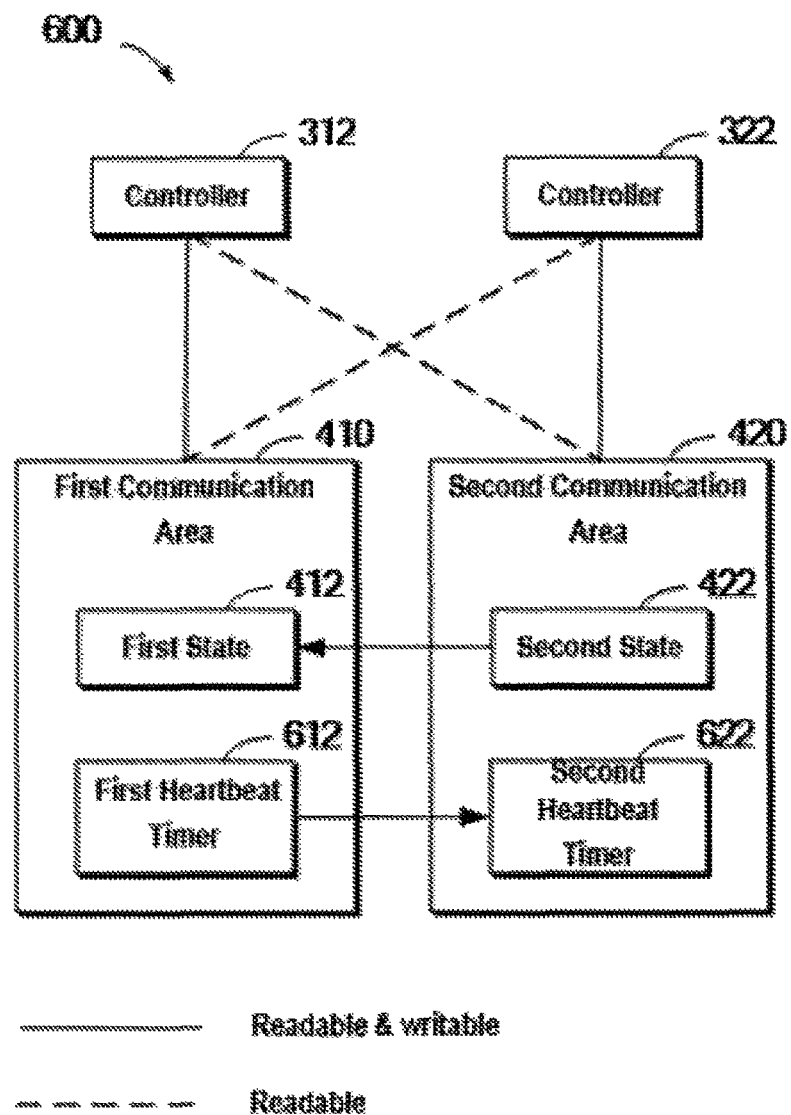
FIG. 6 schematically illustrates an architecture view of a technical solution for managing a storage system according to one embodiment of the present invention.

In this embodiment, a dedicated heartbeat timer may be set for each controller. FIG. 6 schematically shows an architecture view 600 of a technical solution for managing a storage system according to one embodiment of the present invention. Compared with the storage system shown in FIG. 4, FIG. 6 further comprises: a first heartbeat timer 612 deployed in the first communication area 410, and a second heartbeat timer 622 deployed in the second communication area 420. Here the first heartbeat timer 312 may be periodically updated where the controller 312 can access the storage device, for example, update the timestamp at an interval of one second. Before the timeout of the first heartbeat 612, the second state 422 in the second communication area 420 may be periodically read. When the second state 422 becomes "prepared," the initialization operation may be started.

There may exist another situation. Before the timeout of the first heartbeat 612, the connection between the controller 312 and the storage device might fail, and further the storage device is made inaccessible to the controller 312. Then, the first state 412 will be modified as "unprepared" because the timestamp of the first heartbeat 612 is no longer updated. At this point, even if the second state 422 turns "prepared," since the first state 412 is unprepared, the initialization operation cannot be started.

Those skilled in the art may customize the timeout period (e.g. 20 seconds). When the timer reaches 20 seconds, if the controller 322 is not yet prepared, then the controller 312 will no longer wait and perform further operation related to the timeout. Note a feasible implementation of the heartbeat timer is shown here by way of illustration. Those skilled in the art may set the time interval, at which the heartbeat timer updates the timestamp or count, and the timeout of the heartbeat timer, according to the requirements of the given application environment.

Figure 7:
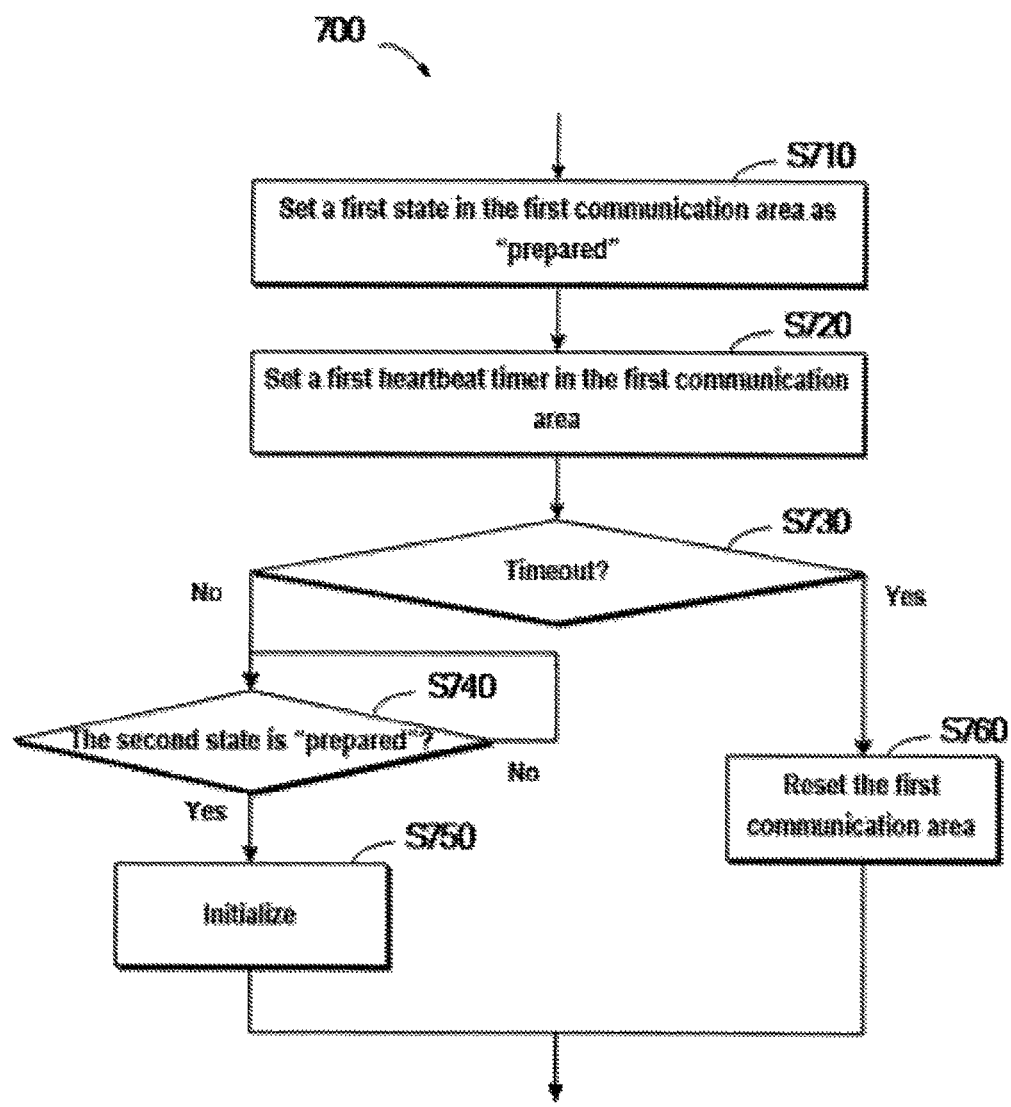
FIG. 7 schematically illustrates a flowchart of a method for managing a storage system according to one embodiment of the present invention.

In one embodiment of the present invention, there is further comprised: in response to the first heartbeat timer expiring, resetting the first communication area. FIG. 7 schematically shows a flowchart 700 of a method for managing a storage system according to one embodiment of the present invention. First of all, in step S710, in response to the first controller successfully accessing the storage device, the first state in the first communication area is set as "prepared. Next, in step S720, the first heartbeat timer is set in the first communication area. Those skilled in the art may set parameter values of the heartbeat timer according to the requirements of the given application environment.

In step S730, a timeout is judged. If the timer expires, then the operation flow proceeds to step S760 to reset the first communication area. At this point, the creation process of the storage system fails, and the storage system may be restored to the initial state and a next-round creation work may be started. When step S730 results in "No," a value of the second state in the second communication area may be checked periodically at step S740; when the second state turns "prepared," then the operational flow proceeds to step S750 to initiate the operation of initializing the storage system. Note FIG. 7 schematically shows the flow of operations about the first controller, and corresponding operations may also be performed to the second controller.

In one embodiment of the present invention, the storage system is a Redundant Array of Independent Disks which including a plurality of storage devices. The method further comprises: for each storage device among the plurality of storage devices, initializing the storage system in response to the second state associated with each storage device indicating the second controller successfully accesses the each storage device.

When the storage system is RAID, the above-described method may be executed with respect to each storage device (e.g. Storage disk) in this RAID. Note in the embodiment of the present invention, various configuration parameters used for creating RAID may be read from a creation configuration file, such as the number of storage devices comprised in the storage system, identifiers of storage devices, etc.

In one example, suppose it is defined in the creation configuration file that RAID comprises 5 storage disks whose identifiers are 210A, 212A, 214A, 216A and 218A respectively (as shown in FIG. 2A), then at this point the above operations have to be performed to each disk. For example, suppose first of all the first controller has successfully accessed the 5 storage disks, and the respective first states associated with the 5 disks are set as "prepared." At this point the flow has to wait for the second states, written by the second controller for the 5 storage disks, to change to "prepared" before initiating RAID initialization. If any one of the 5 storage disks does not get prepared within a given time period (e.g., because any controller fails to access storage disk 210A), then the process of creating RAID fails.

Note since in the embodiment of the present invention a shared storage area (e.g. the first and second communication areas) arranged on a storage device in the storage system is used as an intermediary agent for transmitting information between the first and second controllers, various controllers' access states to the storage device will affect the mode of information transmission between the first and second controllers. Hereinafter, description is presented first to states of the storage system which are defined based on possible access states between the controller and the storage device.

In a conventional RAID storage system, states of the storage system may be categorized as recovering, active, degraded and failed. Since the RAID storage system is managed in dependence on the shared storage area, in various embodiments of the present invention states of the storage system will become more complex and comprise the following.

Recovering: this state means that all storage devices in the RAID group are "online" for the two controllers, and the RAID group is initializing or rebuilding.

Active: this state means that the RAID group states are both active for the two controllers and all storage devices in the RAID group are all accessible by the two controllers.

Degraded: this state means that a same storage device in the RAID group is "broken" for the two controllers.

Failed: this state means that the RAID group is failed for the two controllers.

Active/Degraded: this state means that the RAID group is active for one controller and is degraded for the other controller.

Active/Failed: this state means that the RAID group is active for one controller and is failed for the other controller.

Degraded/Failed: this state means that the RAID group is degraded for one controller and is failed for the other controller.

Recovering/Failed: this state means that the RAID group is recovering on one controller and is failed on the other controller.

Note although there are the above 8 internal states in the RAID storage system, from the view of an external device, the RAID storage system only presents 4 states. For example, while the internal state is active, active/degraded or active/failed, the external state is active. While the internal state is recovering or recovering/failed, the external state is recovering. While the internal state is degraded or degraded/failed, the external state is degraded. Only when the internal state is failed, the external state is failed.

For the sake of following description, states of controllers are first defined as below:

SP-A: the controller under the active state in the RAID group is referred to as SP-A;

SP-D: the controller under the degraded state in the RAID group is referred to as SP-D;

SP-R: the controller under the recovering state in the RAID group is referred to as SP-R;

SP-F: the controller under the failed state in the RAID group is referred to as SP-D.

Figure 8:
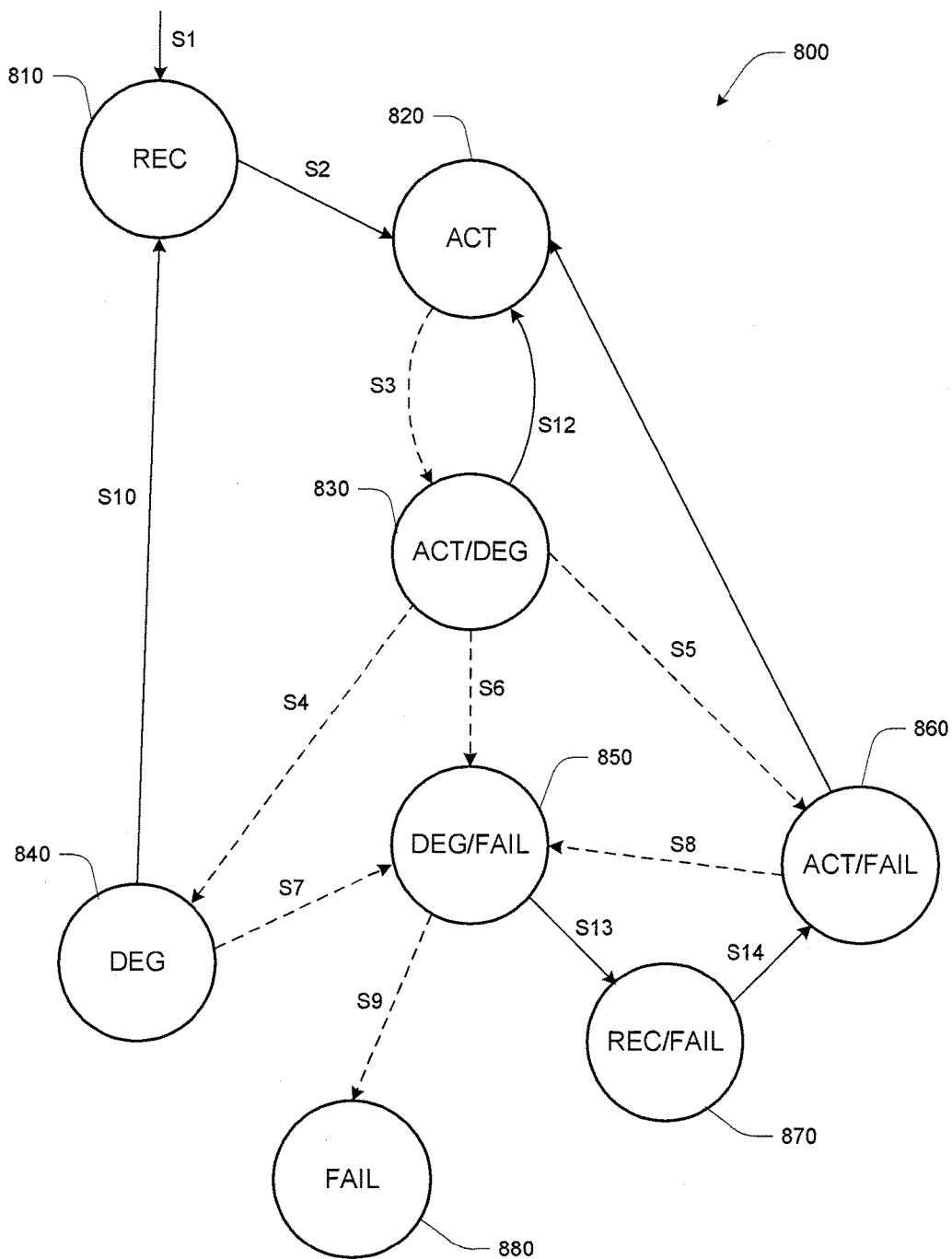
FIG. 8 schematically illustrates a schematic view of state transitions of a storage system according to one embodiment of the present invention.

With reference to FIG. 8, detailed description is presented below to transition relationships between internal states of a RAID storage system. Specifically, FIG. 8 shows a schematic view 800 of state transitions of a storage system according to one embodiment of the present invention. Note in FIG. 8, reference numerals 810, 820, . . . , 880 respectively denote the above 8 internal states of the storage system, and arrows shown by reference numerals S1, S2, . . . , S14 represent transition relationships between the various states. Hereinafter, various transition relationships are described with reference to FIG. 8, wherein arrows shown in solid lines represent the state of the storage system "gets better," and arrows shown in dashed lines represent the state of the storage system "gets worse." In FIG. 8, the following abbreviations are used:

REC: Recovering
ACT: Active
DEG: Degraded
FAIL: Failed

S1: after the RAID group is created, the RAID group will start the initialization, and at this point the RAID group enters the recovering state 810.

S2: after the initializing is completed, the state of the RAID group transits from the recovering state 810 to the active state 820.

S3: under active state 820, if a disk device is offline for the SP-A, the state would be transited to the active/degraded state 830.

S4: under the active/degraded state 830, if the same disk device is offline for the SP-A, the state would be transited to the degraded state 840.

S5: under the active/degraded state 830, if another disk device is offline for the SP-D, the state would be transited to the active/failed state 860.

S6: under the active/degraded state 830, if another disk device is offline for the SP-A, it means different disk devices are offline for the two controllers, at which point the state would be transited to the degraded/failed state 850.

S7: under the degraded state 840, if one disk is offline for the SP-D, the state would be transited to the degraded/failed state 850.

S8: under the active/failed state 860, if one disk is offline for the SP-A, the state would be transited to the degraded/failed state 850.

S9: under the degraded/failed state 850, if another disk is offline for the SP-D, the state would be transited to the failed state 880, and under this state the data would be lost.

S10: under the degraded state 840, if a new disk is added to the RAID group, the RAID group would start to rebuild, and at this point the state would be transited to the recovering state 810.

S11: under the active/degraded state 830, if the offline disk for SP-D is recovered, the state would be transited back to the active state 820.

S12: under the active/failed state 860, if the offline disks for SP-D are all recovered, the state would be transited back to the active state 820.

S13: under the degraded/failed state 850, if one new disk is added to the RAID group, the SP-D would start to rebuild the RAID group, and the state would be transited to the recovering/failed state 870.

S14: under the recovering/failed state 870, after the rebuilding is completed, the state would be transited to the active/failed sate 860.

In one embodiment of the present invention, the storage system comprises a plurality of storage devices, and the first communication area is deployed across the plurality of storage devices. In one embodiment of the present invention, the storage system comprises a plurality of storage devices, and the second communication area is deployed across the plurality of storage devices. In this embodiment, the storage system may comprise a plurality of storage devices. Specifically, the first and second communication areas may cross a plurality of storage devices so as to accommodate state data and heartbeat timer data for each storage area.

Figure 9:
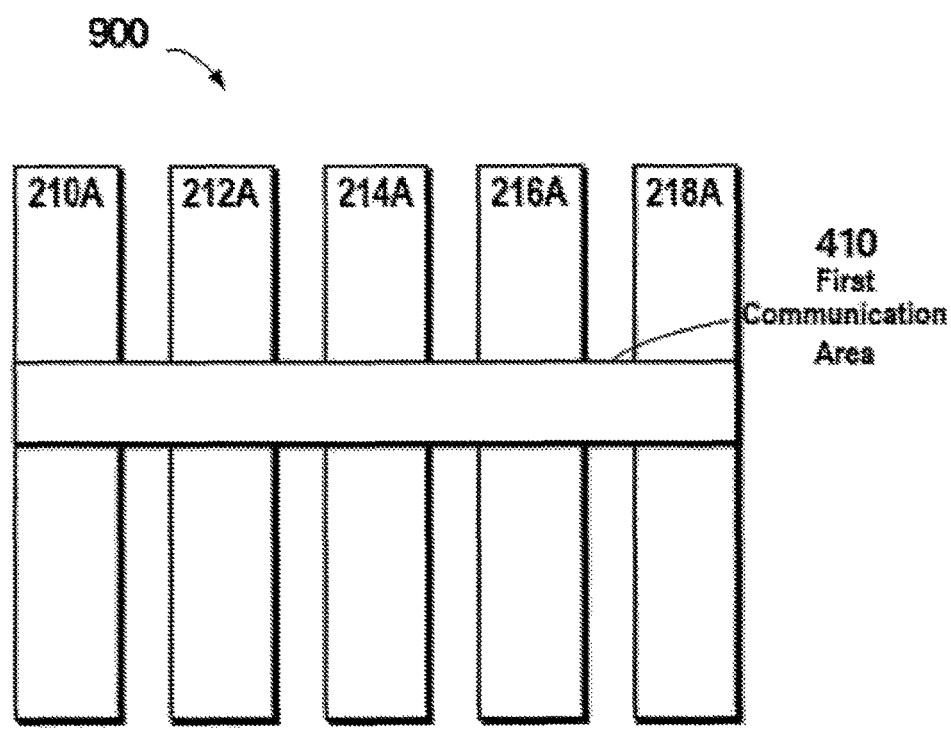
FIG. 9 schematically illustrates a schematic view of a first communication area deployed across a plurality of storage devices in a storage system according to one embodiment of the present invention.

FIG. 9 shows a schematic view 900 of a first communication area deployed across a plurality of storage devices in a storage system according to one embodiment of the present invention. As shown in FIG. 9, first communication area 410 is deployed across RAID. Due to redundant storage devices comprised in storage devices 210A, 212A, 214A, 216A and 218A, when one storage device in the storage system fails, state data and heartbeat timer data related to various storage areas in first communication area 410 may be recovered via data in other storage devices. In this manner, when one storage device, e.g. 218A fails, data in first communication area 410 may be recovered from other storage devices (for example, referring to the recovery process shown in FIG. 2B). In this embodiment, the storage system can be managed in a more secure and reliable manner.

Note although only the situation where the first communication area 410 is deployed across a plurality of storage devices in RAID and data in the first communication area 410 can be recovered from the storage devices operating normally has been illustrated with reference to FIG. 9, in other embodiments the second communication area may also be deployed in a manner similar to the first communication area.

By way of illustration, description is presented below to concrete examples of the storage system's initialization, rebuilding and processing of data access operations from an external host. In one embodiment of the present invention, the initializing the storage system comprises: setting the first state associated with one storage device among the plurality of storage devices as "recovering," and setting the first state associated with other storage device among the plurality of storage devices as "active;" recovering, based on data in the other storage device whose first state is "active," data in the storage device whose first state is "recovering;" and updating the first state from "recovering" to "active."

Continue the foregoing example. In a RAID group consisting of 5 storage disks, when the 5 storage disks are all online on the first and second controllers (i.e., both the first and second states for the 5 storage disks are "prepared"), the initialization operation is initiated. At this point, the 5 storage disks are in the same state, so any one storage disk (e.g. the $1^{st}$ storage disk) may be selected as a redundant disk. The first state of the selected $1^{st}$ storage disk may be set as "recovering," and the first state for the other storage disks may be set as "active."

In subsequent operation steps, data in "active" disks (i.e. $2^{nd}$ to $5^{th}$ storage disks) is regarded raw data, so the parity may be calculated based on these raw data and written to the storage disk that is in the "recovering" state. As one example, during initialization of the RAID group, "0" may be written to 4 "active" storage disks, at which point all data in the 4 active storage disks is "0." Subsequently, the parity may be calculated based on "0" and written to the $1^{st}$ storage disk.

Throughout the context of the present invention, operations executed during the RAID initialization and rebuilding are the same, namely recovery operation. Concrete steps of the recovery operation will be described in detail below. During the recovery operation, in order to prevent data inconsistency in the storage system, it is necessary to lock storage devices in the storage system. Storage devices in the storage system may be divided into areas, and the recovery operation may be executed with respect to each storage area.

In one embodiment of the present invention, the recovering, based on data in the other storage device whose first state is "active," data in the storage device whose first state is "recovering" comprises: with respect to a storage area across the plurality of storage devices, locking the storage area; and in the storage area, recovering data in the storage device whose first state is "recovering," based on data in the other storage device whose first state is "active."

In one embodiment of the present invention, there is further comprised: in response to one storage device among the plurality of storage devices failing, adding a backup storage device to the storage system and updating a first state associated with the backup storage device as "recovering;" recovering data in the storage device whose first state is "recovering," based on data in the other storage device whose first state is "active;" and updating the first state associated with the backup storage device from "recovering" to "active."

In this embodiment, the recovery process is similar to the recovery process in conventional RAID, and the difference is that the operation of locking the storage area here is also implemented based on the above-described first and second communication areas.

In this embodiment, by taking stripes in RAID as the unit, the recovery operation may be executed one after another stripe. Suppose the storage system comprises 10 stripes, then the first stripe may be first locked during recovery, and the parity may be calculated based on data in the first stripe in the above $2^{nd}$ to $5^{th}$ storage devices and written to a corresponding position in the first stripe in the $1^{st}$ storage device. After completing the operation to the first stripe, the first stripe is unlocked, and likewise, the second stripe is processed; the flow does not end until the processing to all 10 stripes is completed.

Like the example of writing the first state (describing an access relationship between the first controller and the storage device) and the second state (describing an access relationship between the second controller and the storage device) to the first communication area and the second communication area respectively as above described with reference to FIG. 4, in one embodiment of the present invention, a lock message may be delivered between the first and second controllers by setting a first lock flag and a second lock flag in the first communication area and the second communication area respectively.

In one embodiment of the present invention, the locking, with respect to a storage area across the plurality of storage devices, the storage area comprises: writing to the first communication area a first lock flag associated with the storage area; reading from the second communication area a second lock flag associated with the storage area; and in response to the second lock flag indicating that the storage area is not locked by the second controller, locking the storage area by the first controller.

Figure 10:
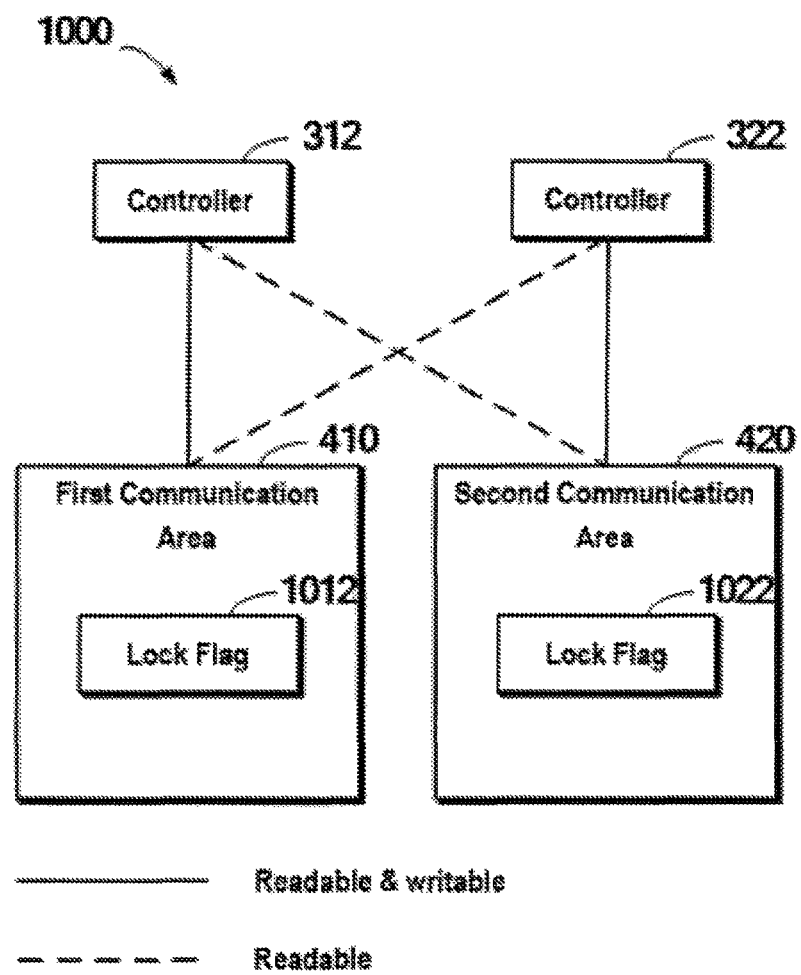
FIG. 10 schematically illustrates an architecture view of a technical solution for locking a storage area in a storage system according to one embodiment of the present invention.

FIG. 10 schematically illustrates an architecture view 1000 of a technical solution for locking a storage area in a storage system according to one embodiment of the present invention. As shown in FIG. 10, the storage system comprises two controllers, namely controller 312 and controller 322. Moreover, two communication areas, namely first communication area 410 and second communication area 420, are arranged in the storage system. The two communication areas can be accessed by the controllers 312 and 322, with difference in access permission. Readable and writable access permission is shown in solid lines; for example, the first communication area 410 is readable and writable to the controller 312, and the second communication area 420 is readable and writable to the controller 322. Readable access permission is shown in dashed lines; for example, the second communication area 420 is readable to the controller 312, and the first communication area 410 is readable to the controller 322.

As shown in FIG. 10, by arranging in the storage system the first and second communication areas that have different access permission to the two controllers, messages are delivered via the two communication areas, and further the need to build an extra communication channel between the two controllers for delivering locked messages is avoided. In response to the controller 312 receiving an access request for accessing a storage area, a lock flag 1012 may be written to the first communication area 410, to indicate that the controller 312 desires to lock the storage area associated with the data access request. At the other controller 322, in response to receiving an access request for accessing the storage area, a lock flag 1022 may be written to the second communication area 410, to indicate that the controller 322 desires to lock the storage area associated with the data access request.

At this point, by reading the lock flag 1022 in the second communication area 420, the controller 312 determines whether or not the storage area desired to be accessed has been locked by the controller 322. If the lock flag 1022 indicates that the storage area has not been locked by the controller 322, then the controller 312 may lock the storage area and execute corresponding data access operation.

Figure 11:
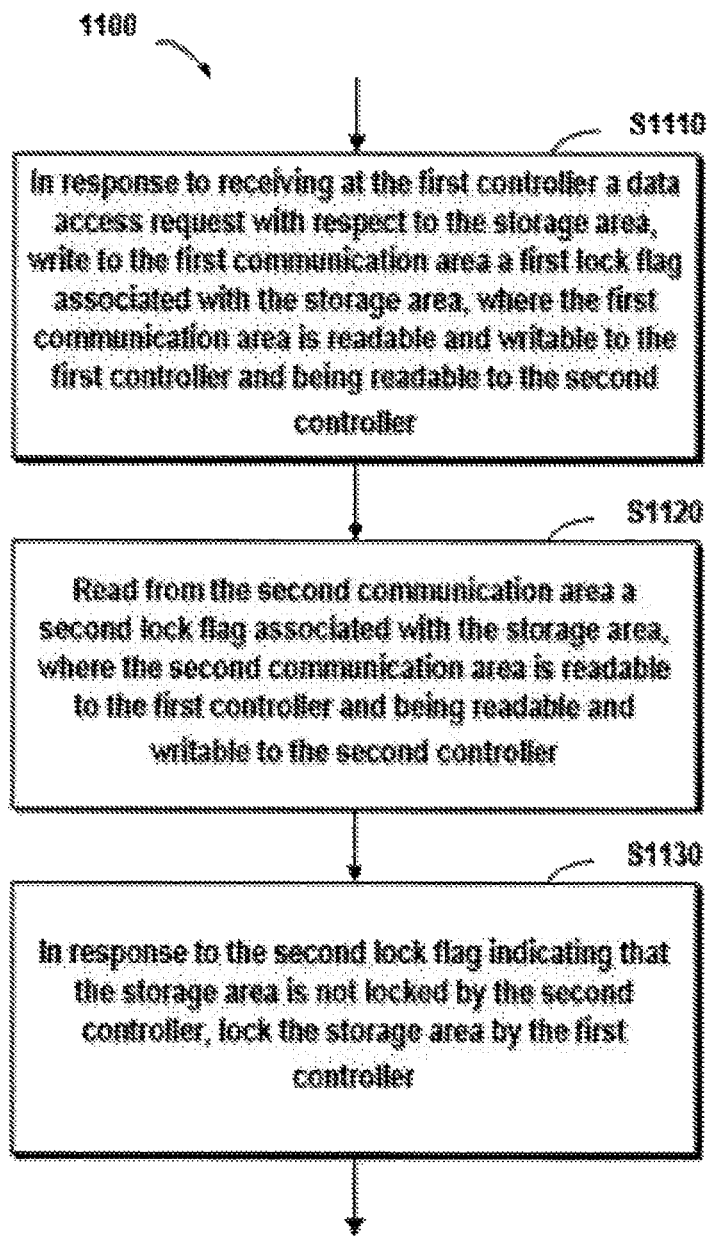
FIG. 11 schematically illustrates a flowchart of a method for locking a storage area in a storage system according to one embodiment of the present invention.

With reference to FIG. 11, detailed description is presented below to concrete steps of the locking method of the present invention. FIG. 11 schematically illustrates a flowchart 1100 of a method for locking a storage area in a storage system according to one embodiment of the present invention. First of all, in step S1110 in response to receiving at a first controller a data access request with respect to the storage area, a first lock flag associated with the storage area is written to a first communication area, where the first communication area is readable and writable to the first controller and is readable to a second controller. In this embodiment, a shared communication area that is accessible to both the first and second controllers is allocated in the storage system as an intermediary agent for message delivery, so that overheads for transmitting lock messages by building an extra communication channel between two controllers are avoided.

In step S1120, a second lock flag associated with the storage area is read from the second communication area, where the second communication area is readable to the first controller and is readable and writable to the second controller. In this embodiment, each of the two controllers can write a lock flag to its own communication area, to indicate that the controller desires to lock the storage area. In the meantime, each one of the two controllers may read, from a communication area that is readable and writable to the other controller, a lock flag describing the lock state of the other controller towards the storage area. In this way, it may be determined whether such a "conflict" of both controllers wanting to concurrently lock and access the same storage area occurs between the controllers, and further it may be determined which controller gains the access permission.

In step S1130, in response to the second lock flag indicating that the storage area is not locked by the second controller, the storage area is locked by the first controller. In this step, that the first controller locks the storage area is indicated by the first lock flag in the first communication area. For example, the first lock flag is set as "locked."

In this example, by writing respective lock flags to the first and second communication areas, a controller desiring to lock a storage area may determine whether or not the storage area desired to be accessed has been locked by the peer controller, by reading the lock flag written by the peer controller. In this way, there is no need to build a dedicated communication channel between the first controller and the second controller, but lock messages are transferred based on an existing communication channel (e.g. data transmission channel between the controller and the storage device like a disk device) in the storage system.

In one embodiment of the present invention, to avoid the situation where a storage area is locked by one controller for a long time and thus cannot be accessed by the other controller, priorities may be set to storage areas in the storage system, and it is provided that a controller with a higher priority has preferential access permission.

Figure 12:
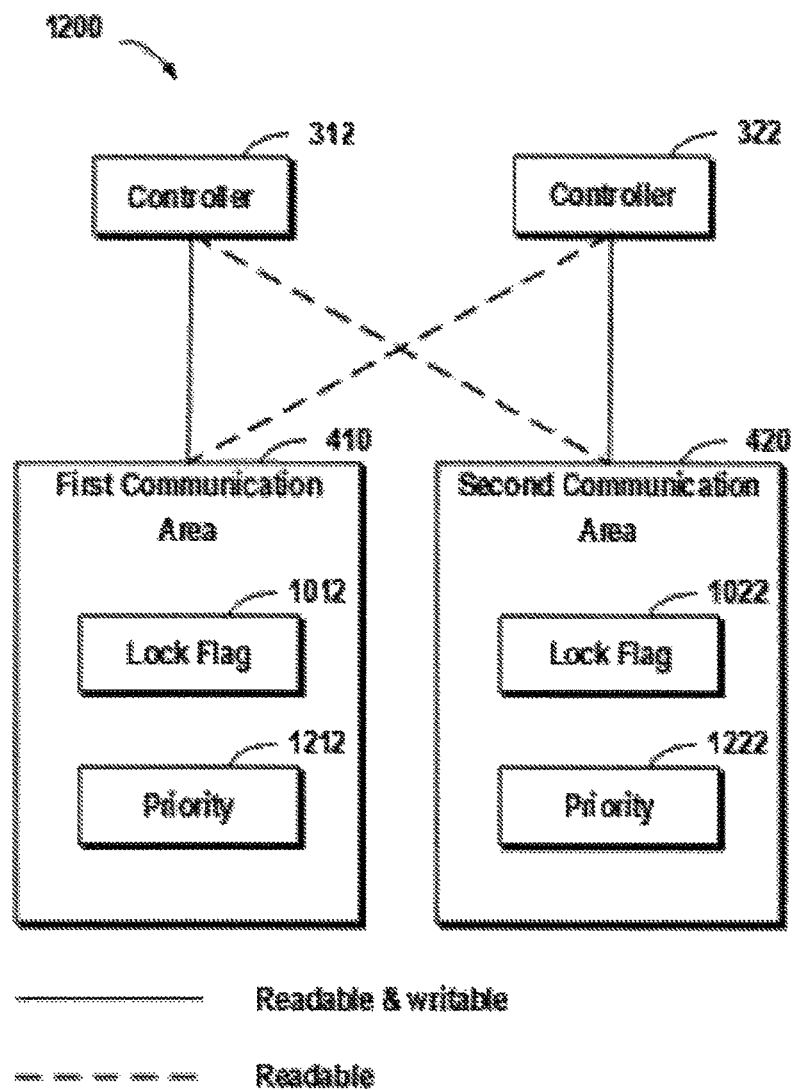
FIG. 12 schematically illustrates an architecture view of a technical solution for locking a storage area in a storage system according to one embodiment of the present invention.

FIG. 12 schematically illustrates an architecture view 1200 of a technical solution for locking a storage area in a storage system according to one embodiment of the present invention. The architecture shown in FIG. 12 is similar to contents in FIG. 10, and the difference is that FIG. 12 further comprises priorities. Specifically, in the first communication area 410 there is included a priority 1212 to indicate the access priority of the controller 412 to the storage area, and in the second communication area 420 there is included a priority 1222 to indicate the access priority of the controller 422 to the storage area.

In one embodiment of the present invention, in response to the second lock flag indicating that the storage area is locked by the second controller, a first priority associated with the first lock flag is read from the first communication area, and a second priority associated with the second lock flag is read from the second communication area; and the storage area is locked based on a comparison between the first priority and the second priority.

In one embodiment of the present invention, the locking the storage area based on comparison between the first priority and the second priority comprises: in response to the first priority being lower than the second priority, unlocking the storage area by the first controller; and updating the first lock flag to "unlocked."

Continuing the foregoing example, concrete values of priorities may be set initially or in response to other conditions being triggered. For example, when the storage system is started, the first priority may be set to 1000, and the second priority may be set to 1001. In this case, since the first controller has a lower priority (1000<1001), at this point the first controller should not access the storage area desired to be accessed. In other words, the first controller fails in acquiring the lock, and the first lock flag set in the previous step needs to be updated to "unlocked."

In one embodiment of the present invention, the locking the storage area based on a comparison between the first priority and the second priority comprises: in response to the first priority being higher than the second priority, unlocking the storage area by the second controller; and updating the second lock flag to "unlocked." Continuing the foregoing example, the first priority may be set to 1001, and the second priority may be set to 1000. In this case, since the first controller has a higher priority (1001>1000), at this point the first controller may access the storage area desired to be accessed. In other words, the second controller fails in acquiring the lock, and the second lock flag needs to be updated to "unlocked."

Figure 13:
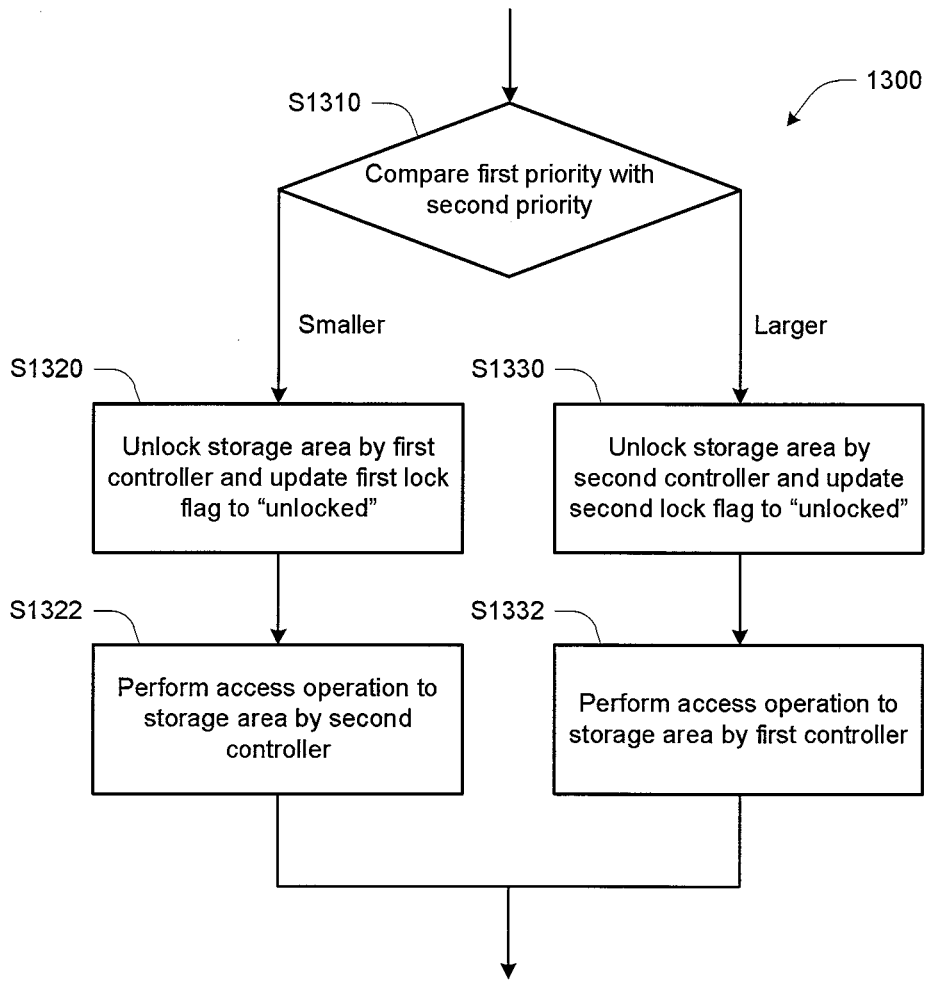
FIG. 13 schematically illustrates a flowchart of a method for locking a storage area in a storage system according to one embodiment of the present invention.

FIG. 13 schematically illustrates a flowchart 1300 of a method for locking a storage area in a storage system according to one embodiment of the present invention. In step S1310, a first priority is compared with a second priority. In response to the first priority being lower than the second priority, the operation flow proceeds to step S1320, in which a first controller unlocks the storage area and updates a first lock flag to "unlocked." Next in step S1322, since a second controller has preferential access permission, the second controller may access the storage area.

In addition, in response to the first priority being higher than the second priority, the operation flow proceeds to step S1330, in which the second controller unlocks the storage area and updates a second lock flag to "unlocked." Next in step S1332, since the first controller has preferential access permission, the first controller accesses may access the storage area. Throughout the context of the present invention, regarding a specific storage area, a controller with a higher priority may access the specific storage area preferentially; and a controller with a lower priority has to wait for the controller with a higher priority to unlock the storage area, before accessing the storage area.

In one embodiment of the present invention, the writing a first lock flag to the first communication area comprises: determining, based on lock metadata contained in the storage system, an address of a lock flag associated with the storage area; and writing the first lock flag to the address so as to indicate that the storage area is locked by the first controller.

Figure 14:
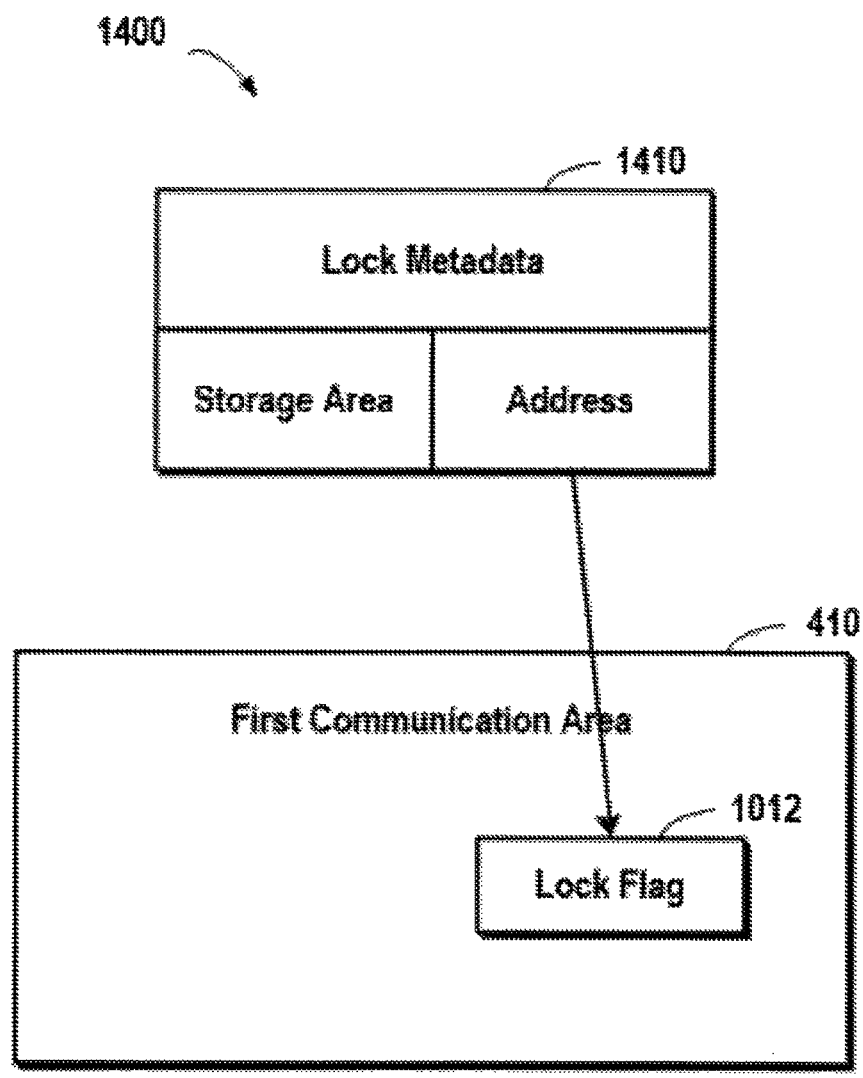
FIG. 14 schematically illustrates a schematic view of a relationship between lock metadata and a first communication area according to one embodiment of the present invention.

In this embodiment, lock metadata may be set in the storage system for describing at which location a lock flag associated with the storage area is stored. Those skilled in the art may implement the embodiment by using a lookup table, for example. A dedicated storage space may be allocated in the first communication area for storing the first and second priorities and the first and second lock flags associated with the specific storage area. FIG. 14 illustrates a schematic view 1400 of a relationship between lock metadata and the first communication area according to one embodiment of the present invention.

As shown in FIG. 14, a corresponding address may be looked up in lock metadata 1410 based on ID of a storage area. The address points to a space (e.g. address where lock flag 1012 is located) storing a lock flag in first communication area 410. Specifically, lock metadata may be represented using a data structure as shown in Table 1 as below.

TABLE 1

Data Structure of Lock Metadata

| No. | Storage Area ID | Address of First Lock Flag | Address of Second Lock Flag |
|---|---|---|---|
| 1 | Storage Area 1 | Address-flag-1 | Address-flag-2 |
| 2 | Storage Area 2 | . . . | . . . |
| . . . | . . . | . . . | . . . |

In other embodiments, those skilled in the art may define, according to needs of a concrete application environment, in which manner the lock metadata is stored, so long as the manner can define a mapping relationship between storage area IDs and concrete addresses. For example, a hash algorithm may be used for implementation. A hash table is a data structure that performs access according to key values, where the algorithm may perform access by mapping key values to locations in the table so as to speed up a lookup. Based on general principles of the hash algorithm, those skilled in the art may implement the hash algorithm that describes relationships between storage area IDs and addresses in the context of the present invention. In addition, although Table 1 shows only two fields, in other embodiments Table 1 may further include fields pointing to addresses of the first priority and the second priority.

In one embodiment of the present invention, there is further comprised: in response to the data access request by the first controller with respect to the storage area being completed, updating the first priority to be lower than the second priority. In one embodiment of the present invention, there is further comprised: in response to the data access request by the second controller with respect to the storage area being completed, updating the second priority to be lower than the first priority.

The purpose of updating the priority of a controller with a higher priority lies in preventing the controller with a higher priority from locking the storage area for a long time. Therefore, after a controller successfully locks and accesses the storage area, the value of its priority may be decreased and the peer controller is made to have a higher priority. In this way, during subsequent access to the storage area, the peer controller has a higher priority and thus has preferential access permission. After the peer controller successfully accesses the storage area, its priority will also be decreased. In this embodiment, by updating priorities alternately, the two controllers will alternately obtain access permission to the storage area.

Continuing the foregoing example, suppose the first priority is 1001 and the second priority is 1000. After the first controller successfully executes locking, data accessing and lock releasing, the first priority may be decreased from 1001 to 999. In this way, the second controller has a higher priority and preferentially obtains access permission in subsequent access.

In other embodiments, another priority updating policy may further be adopted. For example, suppose the first controller is configured to process multiple urgent preferential access requests, then at this point the first priority may be updated to be lower than the second priority after the first controller has processed the multiple preferential access requests.

In one embodiment of the present invention, the storage system comprises a plurality of storage devices, and the first communication area is deployed across the plurality of storage devices. In one embodiment of the present invention, the storage system comprises a plurality of storage devices, and the second communication area is deployed across the plurality of storage devices. In this embodiment, the storage system may comprise a plurality of storage devices, and the plurality of storage devices may be ordinary disk devices and provide a larger storage area in the form of an array. Specifically, the first communication area may cross a plurality of storage devices to provide a larger communication area, so as to accommodate priority data and lock flags with respect to more storage areas.

In one embodiment of the present invention, the storage system is a Redundant Array of Independent Disks, and the method further comprises: in response to one storage device among the plurality of storage devices failing, recovering data in the first communication area from other storage devices among the plurality of storage devices.

Continuing the foregoing example, suppose the first communication area is deployed across RAID consisting of 5 storage devices. Since there is included redundant storage device(s) among these storage devices, when one storage device in the storage system fails, priority data and lock flags about various storage devices in the first communication area may be recovered from data in other storage devices. In this way, when one storage device fails, data in the first communication area may be recovered from the other four storage devices (e.g. with reference to the recovery process as shown in FIG. 2B). In this embodiment, the lock information may be delivered between the two controllers in a more secure and reliable manner.

In one embodiment of the present invention, the storage area is one or more stripes in the storage system. Note the present invention does not limit the size of the storage area associated with data access operations. In different embodiments, sizes of the storage devices may be the same or different. Those skilled in the art may set locking mechanisms at different granularity according to needs of concrete application environments.

Detailed processing is presented below to data access (read and write) operations under 8 different states of the RAID group.

When the RAID group is under the active state, if two controllers write data to the same stripe, then a conflict problem will arise. Therefore, like a conventional RAID group, a stripe has to be locked before write. On the other hand, since the read operation only reads data in a disk device and does not read the parity, the read operation will not lead to data conflicts and can be processed directly without locking.

When the RAID group is under the recovering state and the degraded state, if data is read from a non-active disk, then data in the non-active disk has to be calculated from data in other disk. At this point, if another controller is performing write to the same stripe, then a conflict will arise. Thereby, the stripe being read needs to be locked when performing the read operation under the recovering state and the degraded state.

When RAID is under the active/degraded, degraded/failed, or recovering/failed state, only one controller may access the RAID group, so there is no need for locking before read and write operations.

When the RAID group is under the failed state, it is inaccessible.

When the RAID group is under the active/degraded state, the RAID group may be accessed by two controllers. For data access operations, a special operational flow is required, which is described in detail as below.

In one embodiment of the present invention, there is further comprised: in response to the first state indicating the first controller cannot access an offline storage device among the plurality of storage devices, in response to receiving a write request, writing data associated with the write request to an online storage device among the plurality of storage devices which is accessible to the first controller; and writing a notification message to the first communication area to notify the second controller to synchronize data from the online storage device to the offline storage device.

In this embodiment, suppose the RAID group includes 5 storage devices, the first controller can only access four of the 5 storage devices (e.g. can access the $2^{nd}$ to $5^{th}$ storage devices and cannot access the $1^{st}$ storage device that is offline for the second controller), and the second controller can access all the 5 storage disks normally. At this point, when receiving a write request, the first controller can write data associated with the request (i.e. only writing data but not writing the parity) to the $2^{nd}$ to $5^{th}$ storage devices, and subsequently notifies the second controller by writing a notification message to the first communication area.

In one embodiment of the present invention, there is further comprised: in response to the second controller reading the notification message from the first communication area, calculating based on data associated with the request and written to the online device; and writing the parity data to the offline device.

In this embodiment, since the notification message in the first communication area is readable to the second controller, after reading the notification message, the second controller understands that it should calculate the parity based on data in the $2^{nd}$ to $5^{th}$ storage disks. Further, since all the 5 storage disks are accessible to the second controller, the second controller writes the calculated parity to the $1^{st}$ storage disk.

Note in the context of the present invention, any means may be employed for transmitting the above notification message from the first controller to the second controller. Like the above example of writing the first state (describing an access relationship between the first controller and the storage device) and the second state (describing an access relationship between the second controller and the storage device) to the first communication area and the second communication area respectively as above described with reference to FIG. 4, in one embodiment of the present invention, the notification message is delivered between the first and second controllers by storing a message and an address identifier in the first communication area and the second communication area.

In one embodiment of the present invention, in response to receiving a message to be delivered from the first controller to the second controller, writing the message to the first communication area; and writing an address identifier to the second communication area, the address identifier being used for indicating an address at which the second controller reads the message from the first communication area.

Figure 15:
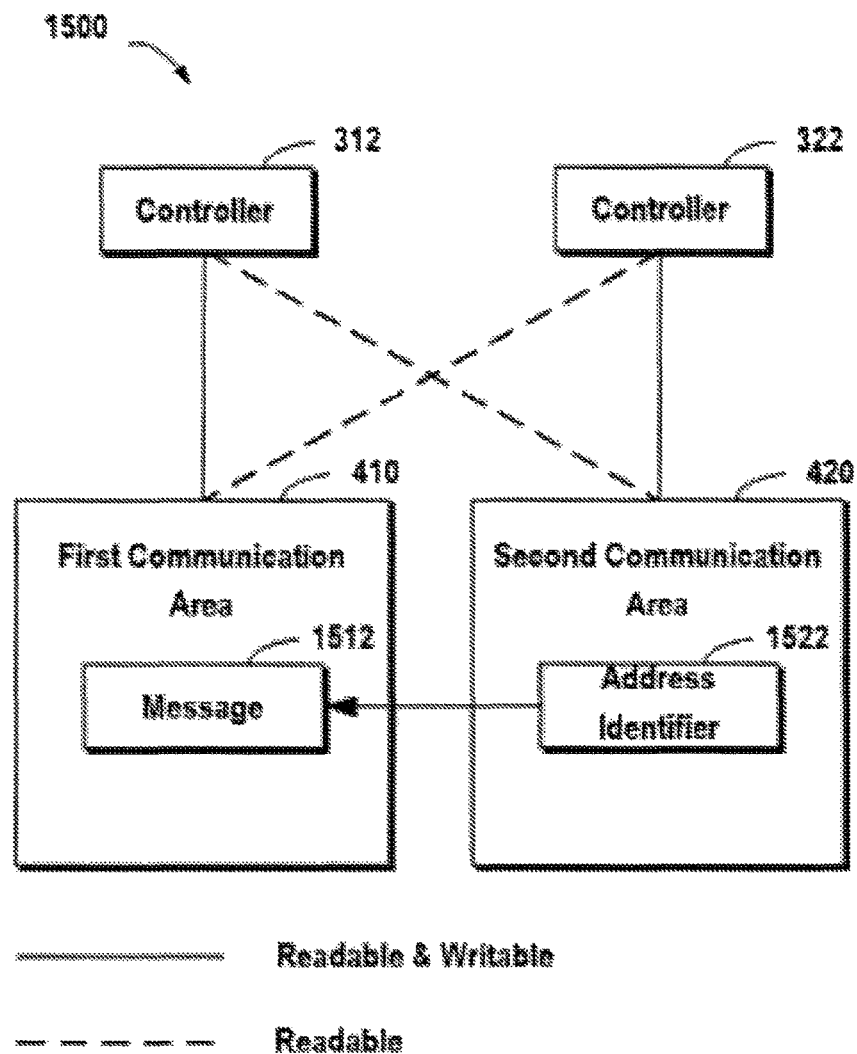
FIG. 15 schematically illustrates an architecture view of a technical solution for delivering messages in a storage system according to one embodiment of the present invention.

FIG. 15 schematically illustrates an architecture view 1500 of a technical solution for delivering a message in a storage system according to one embodiment of the present invention. As shown in FIG. 15, the storage system comprises two controllers, namely the controller 312 and the controller 322. Moreover, two communication areas are arranged in the storage system, namely the first communication area 410 and the second communication area 420. The two communication areas are accessible to controllers 312 and 322, with difference in access permission. Readable and writable access permission is shown in solid lines; for example, the first communication area 410 is readable and writable to the controller 312, and the second communication area 420 is readable and writable to the controller 322. Readable access permission is shown in dashed lines; for example, the second communication area 420 is readable to the controller 312, and the first communication area 410 is readable to the controller 322.

As shown in FIG. 15, by arranging in the storage system the first and second communication areas to which the two controllers have different access permission, messages are delivered via the two communication areas, and further the need to build an extra communication channel between the two controllers is avoided. The controller 312 may write to the first communication area 410 a message 1512 that is desired to be transferred to the controller 322, and write to the second communication area 420 an address identifier 1522 that points to an address of message 1512 in the first communication area 410. In this way, the controller 322 may obtain the address identifier 1522, and the obtain message 1512 from the first communication area 410 via the address identifier 1522.

Figure 16:
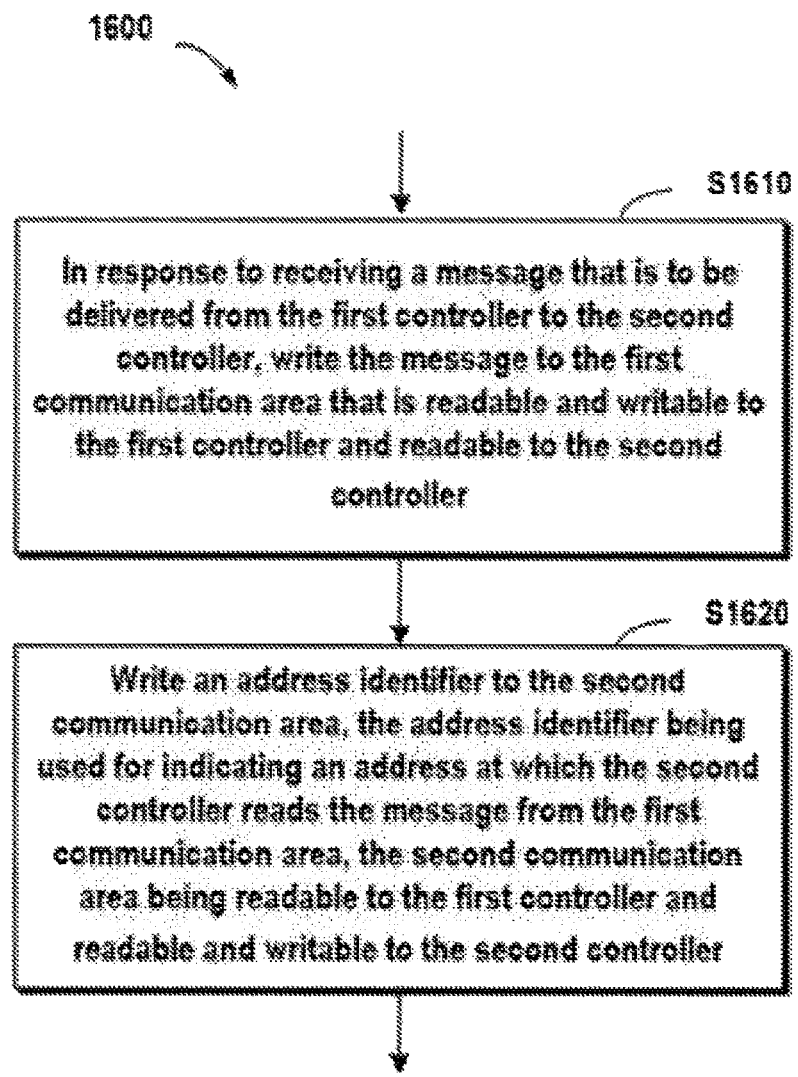
FIG. 16 schematically illustrates a flowchart of a method for delivering messages in a storage system according to one embodiment of the present invention.

With reference to FIG. 16, detailed description is presented below to the concrete flow of a method according to one embodiment of the present invention. FIG. 16 schematically shows a flowchart 1600 of a method for delivering a message in a storage system according to one embodiment of the present invention. In step S1610, in a storage system comprising a first controller, a second controller, a first communication area and a second communication area, in response to receiving a message to be delivered from the first controller to the second controller, the message is written to the first communication area, where the first communication area is readable and writable to the first controller and readable to the second controller. In step S1620, an address identifier is written to the second communication area, where the address identifier is used for indicating an address at which the second controller reads the message from the first communication area, the second communication area is readable to the first controller and being readable and writable to the second controller.

In this example, by writing a message to the first communication and writing the message's address identifier to the second communication area, the second controller is enabled to read the message from the first communication area via the address identifier. In this way, it is not necessary to build a dedicated communication channel between the first controller and the second controller, and instead, messages can be transferred based on existing communication channels in the storage system.

In one embodiment of the present invention, the above described first communication area and second communication area may be deployed in a storage device (e.g., a storage disk or array of storage disks) which is used for storing data and which is comprised in the storage system. Take a single storage disk as one example of the storage device. Dedicated storage areas may be allocated in the storage disk as the first communication area and the second communication area. In the storage system having two access ports (e.g., first controller and second controller), since both controllers are connected to the storage disk in the storage system, message transmission may be implemented by means of existing data channels between the controllers and the storage disk. In this way, no dedicated communication channel needs to be built between the two controllers, so "split-brain" problems caused by failure of a dedicated communication channel are also avoided.

In one embodiment of the present invention, in response to the address identifier having been written to the second communication area, an interrupt message may be sent to the second controller so as to notify the second controller that the message in the first communication area gets ready to be read. In one embodiment of the present invention, those skilled in the art may trigger the second controller to read messages in other manner based on needs of a concrete application environment.

In one embodiment of the present invention, the writing the message to the first communication area comprises: determining state of the first communication area according to metadata in the first communication area; and in response to the state indicating the first communication area is not full, writing the message to the first communication area.

Those skilled in the art may customize a position, size and internal organization mode of the first communication area.

For example, addresses in the first communication area which are used for storing messages may be described by metadata. Since the size of the first communication area may be fixed, before writing the message judgment is made as to whether in the first communication area there still exists an available storage space for writing a new message. When the first communication area is not full, the message may be written thereto; where the first communication area is full, the flow proceeds to wait.

Those skilled in the art may use any technique that is known in the prior art or to be developed later, to determine whether the first communication area is full or not. For example, suppose in the first communication area there is one space for storing only one message, then at this point the metadata may be a pointer pointing to the storage space. A flag may be set in the metadata to indicate whether the storage space has messages stored therein, and further based on the flag, it may be determined whether the first communication area is already full or not. For another example, suppose in the first communication area there are spaces for storing multiple messages, then the multiple spaces may be organized in a queue, the queue's head pointer is represented by metadata, and whether the first communication area is full or not is determined based on various queue operations about the queue.

In one embodiment of the present invention, the writing the message to the first communication area further comprises: based on the metadata in the first communication area, determining an available address for writing the message to the first communication area; and writing the message to the available address. In this embodiment, since the metadata may describe an available address in the first communication area, first an available address may be determined based on the metadata, and subsequently the message may be written to the available address.

In one embodiment of the present invention, the first communication area comprises a message queue, the metadata in the first communication area comprises a head pointer of the message queue; and the method further comprises: in response to the message being written to the available address, updating the head pointer to indicate another available address for writing the message to the first communication area.

In this embodiment there is shown a situation where the first communication area comprises a message queue for storing multiple messages. For example, the head pointer here may point to a currently available storage address. A message, if needing to be transmitted, may be directly written to a position to which the pointer points; after the message is written, the head pointer may point to the next available address. For another example, the head pointer may further point to a last written message in the message queue, at which point an available address is first determined based on the head pointer, then a message is written to the available address, and subsequently the head pointer points to the currently written message.

Figure 17:
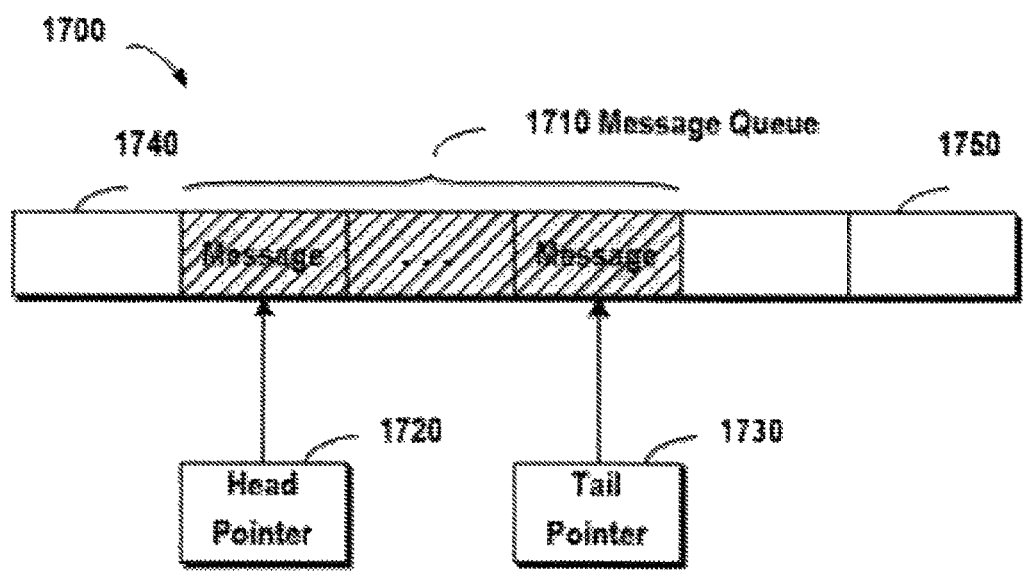
FIG. 17 schematically illustrates a schematic view of a data structure of a first communication area according to one embodiment of the present invention.

In one embodiment of the present invention, the address identifier comprises a tail pointer of the message queue, and the method further comprises: in response to the second controller reading the message from the tail pointer, the second controller updates the tail pointer to point to another message. When messages are stored in a message queue, the message queue may be defined with a head pointer and a tail pointer. Specifically, FIG. 17 shows a schematic view of a data structure of a first communication area 1700 according to one embodiment of the present invention.

First communication area 1700 may comprise storage spaces for storing multiple messages, wherein a position of a message queue 1710 is shown in shadow area, and other available storage spaces in the first communication area 1700 are shown in blanks. In this example, a head pointer 1720 indicates the first message in the message queue which has not been read by the second controller, and a tail pointer 1730 points to the last message that has not been read by the second controller. When it is desired to transmit a new message from the first controller to the second controller, first a position of a current message header may be determined on the basis of the head pointer 1720, and a storage space 1740 adjacent to the message header may be selected for storing a new message, and subsequently the head pointer 1720 moves forward by one position and points to storage space 1740. The second controller reads a message from a position of the tail pointer 1730, for example, after reading a message to which the tail pointer 1730 points, the tail pointer 1730 moves forward by one position.

In one embodiment of the present invention, various storage spaces in the first communication area 1700 may be organized in a ring. For example, through a series of operations, the head pointer 1720 may point to the storage space 1740; where the first communication area 1700 is organized in a ring, a storage space 1750 may be the next storage space associated with the head pointer 1720. In addition, when the first communication area 1700 is organized in a ring, whether the first communication area 1700 is full or not may be judged by a positional relationship between the head pointer 1720 and the tail pointer 1730.

In one embodiment of the present invention, the storage system comprises a plurality of storage devices, the first communication area crosses respective storage areas in the plurality of storage devices, and the respective storage areas in the plurality of storage devices are connected in a ring to form the first communication area. For example, the storage system may comprise a plurality of storage devices, and the plurality of storage devices may be common disk devices and provide a larger storage space as an array. Specifically, the first communication area may cross the plurality of storage devices to provide a larger communication area for holding more messages.

For example, suppose the communication area in each storage device may hold 4 messages. When the storage system comprises 5 storage devices, the communication areas in the 5 storage devices may be connected head to tail to form the first communication area. At this point, the size of the first communication area will become five times as large as the original, i.e., the first communication may hold 20 messages. Note the amount of messages held by the communication area in each storage device is merely illustrative, and in other embodiments those skilled in the art may adjust the amount according to needs of a specific application environment. Further, those skilled in the art may further adjust the size of a space allocated for each message, according to needs of a specific application environment. Details are ignored here.

In one embodiment of the present invention, the storage system is a Redundant Array of Independent Disks, and the method further comprises: in response to one storage device among the plurality of storage devices failing, recovering data in the message queue from other storage devices among the plurality of storage devices.

Figure 18:
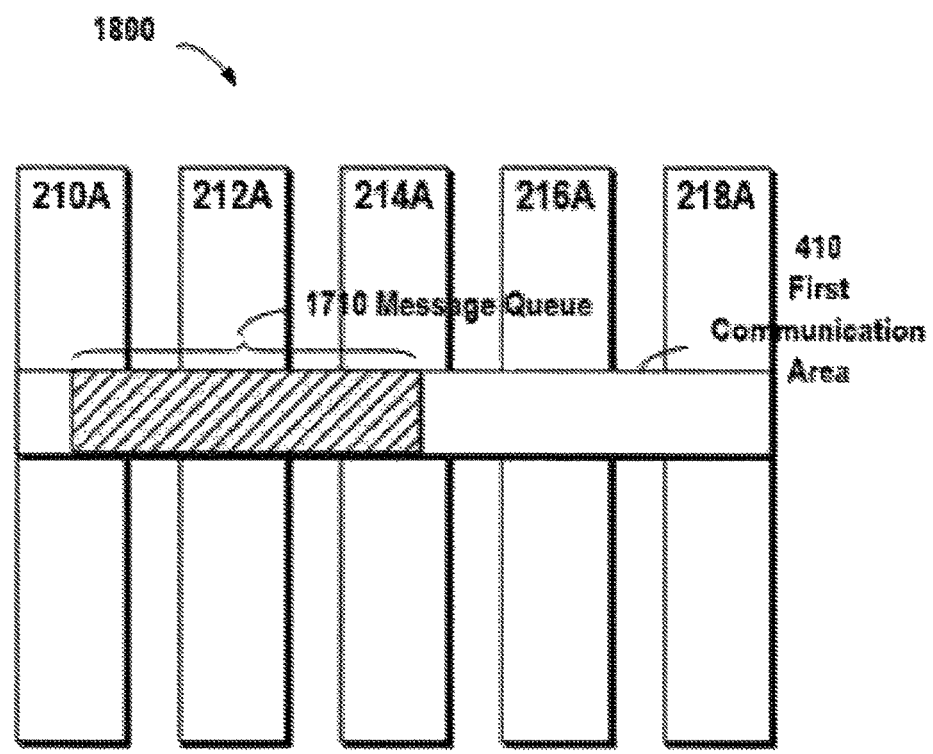
FIG. 18 schematically illustrates a schematic view of a structure of a first communication area deployed across multiple storage devices in RAID according to one embodiment of the present invention.

Specifically, FIG. 18 shows a schematic view 1800 of the structure of a first communication area deployed across a plurality of storage devices in RAID according to one embodiment of the present invention. As shown in FIG. 18, the first communication area 410 is deployed across RAID. For example, an area shown in shadow is the message queue 1710. Since the storage devices 210A, 212A, 214A, 216A and 218A comprise redundant storage devices, when one storage device in the storage system fails, data in the message queue in the first communication area 410 may be recovered from data in other storage devices. In this way, even if in the message queue 1710 there exist messages that have not been read by the second controller, when one storage device, e.g. 212A fails, data in the message queue 1710 may be recovered from the other four storage devices so as to be read by the second controller. In this embodiment, messages may be delivered between two controllers in a more secure and reliable manner.

In one embodiment, the second communication area further comprises messages for storing a message sent from the second controller to the first controller, and the first communication area further comprises an address identifier for indicating an address of a message in the second communication area. In this way, the first controller and the second controller may send messages to each other via the first communication area and the second communication area.

In one embodiment of the present invention, in response to receiving another message to be delivered from the second controller to the first controller, the second controller writes the another message to the second communication area; and another address identifier is written to the first communication area, the another address identifier being used for indicating an address at which the first controller reads the another message from the second communication area.

Note the first controller and the second controller as described in the present invention are two parallel controllers in the storage system, and they may be equal in status. Therefore, various technical solutions that have been described by taking the first controller as example may further be executed on the second controller.

In one embodiment of the present invention, there is provided a method for receiving messages in a storage system comprising a first controller, a second controller, a first communication area and a second communication area, the method comprising: reading an address identifier from the second communication area that is readable to the first controller and readable and writable to the second controller; and reading a message from a position in the first communication area as indicated by the address identifier, the first communication area being readable and writable to the first controller and being readable to the second controller.

The foregoing embodiment records the procedure that the second controller reads a message from the first controller. Specifically, the second controller retrieves an address identifier from the second communication area, and subsequently reads a message from the first communication area based on the address identifier. In one embodiment of the present invention, when messages are stored as a message queue, the second controller, after obtaining a message, may update the address of the address identifier to cause the address identifier to point to another to-be-read message.

In one embodiment of the present invention, the first communication area comprises a message queue, the storage system comprises at least one storage device, and the first communication area crosses respective storage areas in the at least one storage device which are connected in a loop to form the first communication area. In this embodiment, the first communication area may be formed in a ring across a plurality of storage devices in the storage system.

Note in the present invention there are provided technical solutions for managing a storage system, for locking a storage area in a storage system and for delivering messages in a storage system based on a first communication area and a second communication area. These technical solutions may be used separately or in conjunction with one another. Therefore, when different technical solutions area combined, the first communication area and the second communication area may comprise different portions.

Figure 19:
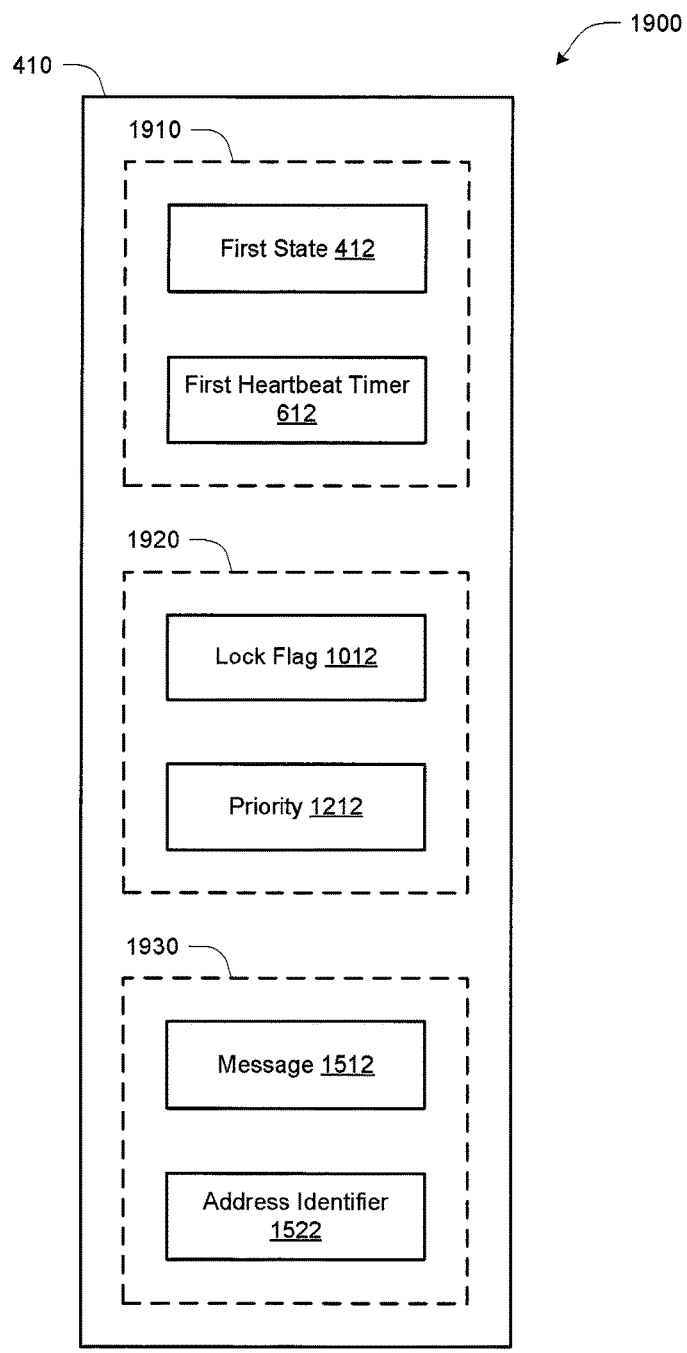
FIG. 19 schematically illustrates an architecture view of a technical solution for delivering messages in a storage system according to one embodiment of the present invention.

FIG. 19 schematically shows an architecture view 1900 of a technical solution for delivering messages in a storage system according to one embodiment of the present invention. Specifically, in the first communication area there may be comprised a first state 412 and a first heartbeat timer 612 (as shown in a dotted box 1910) which are used for achieving the management function of the storage system. Further, the first communication area 410 may comprise a lock flag 1012 and a priority 1212 (as shown in a dotted box 1920) which are used for achieving the locking technical solution. Still further, the first communication area 410 may further comprise a message 1512 and an address identifier 1522 (as shown in a dotted box 1930) which are used for delivering messages between controllers.

Note although FIG. 19 schematically shows configuration information of the first communication area 410, those skilled in the art may configure contents of the second communication area in association with the first communication area 410. For example, when there is a need to implement the technical solution for locking a storage area in a storage system, the first communication area 410 may only comprise portions as shown in the dotted box 1920, and accordingly the second communication area may comprise the lock flag and the priority used for the second controller.

Note although FIG. 19 schematically shows the configuration of first communication area which can simultaneously implement the foregoing three technical solutions, in other embodiments the first communication area 410 may only contain data used for implementing one technical solution. Further note, in other embodiments those skilled in the art may further add data for implementing other technical solution to the first communication area 410 as a specific application environment demands.

Figure 20:
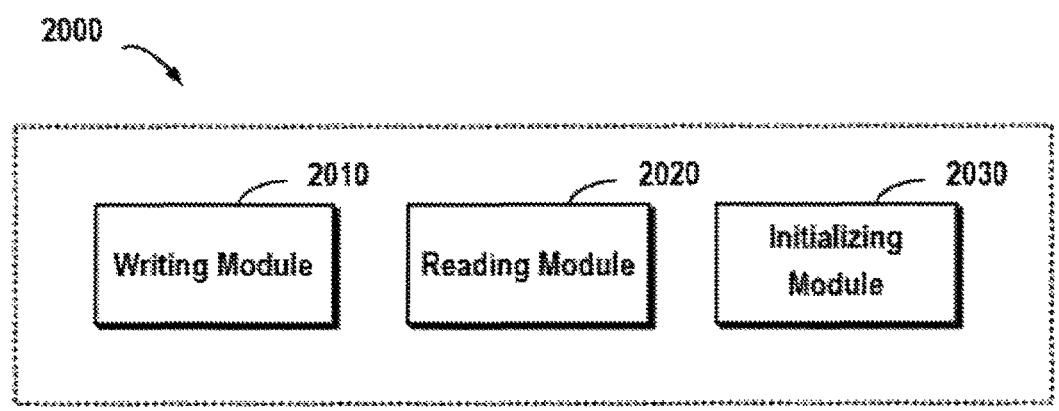
FIG. 20 schematically illustrates a block diagram of an apparatus for managing a storage system according to one embodiment of the present invention.

FIG. 20 schematically shows a block diagram 2000 of an apparatus for managing a storage system according to one embodiment of the present invention. Specifically, there is provided an apparatus for managing storage, comprising: a writing module 2010 configured to, in a storage system comprising a first controller, a second controller, a first communication area as well as a second communication area, with respect to a storage device in the storage system, in response to the first controller successfully accessing the storage device, write to the first communication area a first state that indicates a state relationship between the first controller and the storage device, the first communication area being readable and writable to the first controller and readable to the second controller; a reading module 2020 configured to read from the second communication area a second state that indicates a state relationship between the second controller and the storage device, the second communication area being readable to the first controller and readable and writable to the second controller; and an initializing module 2030 configured to, in response to the second state indicating that the second controller successfully accesses the storage device, initialize the storage system.

In one embodiment of the present invention, there is further comprised: a timing module configured to, in response to the first controller successfully initializing the storage device, set a first heartbeat timer in the first communication area; and periodically read the second state from the second communication area before the first heartbeat timer expires.

In one embodiment of the present invention, there is further comprised: a resetting module configured to reset the first communication area in response to the first heartbeat timer expiring.

In one embodiment of the present invention, the storage system is a Redundant Array of Independent Disks including a plurality of storage devices, and the initializing module is further configured to: with respect to each of the plurality of storage devices, initialize the storage system in response to the second state, associated with the each storage device, indicating the second controller successfully accesses the each storage device.

In one embodiment of the present invention, the first communication area crosses respective storage areas in the plurality of storage devices, and the initializing module is further configured to: set the first state associated with one storage device of the plurality of storage devices as "recovering," and set the first state associated with other storage device of the plurality of storage devices as "active;" recover, based on data in the other storage device whose first state is "active," data in the storage device whose first state is "recovering;" and update the first state from "recovering" to "active."

In one embodiment of the present invention, the initializing module is further configured to: locking a storage area across the plurality of storage devices; and in the storage area, recover data in the storage device whose first state is "recovering," based on data in the other storage device whose first state is "active."

In one embodiment of the present invention, the initializing module is further configured to: write to the first communication area a first lock flag associated with the storage area; read from the second communication area a second lock flag associated with the storage area; and in response to the second lock flag indicating the storage area is not locked by the second controller, lock the storage area by the first controller.

In one embodiment of the present invention, there is further comprised a notifying module configured to: in response to the first state indicating the first controller cannot access an offline storage device among the plurality of storage devices, in response to the first controller receiving a write request, write data associated with the write request to an online storage device that is accessible to the first controller; and write a notification message to the first communication area to notify the second controller to synchronize data from the online storage device to the offline storage device.

In one embodiment of the present invention, there is further comprised a processing module configured to: in response to the second controller reading the notification message from the first communication area, calculate parity data based on data associated with the write request and written to the online device; and write the parity data to the offline device.

In one embodiment of the present invention, there is further comprised: a recovery module configured to, in response to one storage device among the plurality of storage devices failing, add a backup storage device to the storage system and update the first state associated with the backup storage device as "recovering;" recover data in the storage device whose first state is "recovering," based on data in the other storage device whose first state is "active;" and update the first state associated with the backup storage device from "recovering" to "active."

In one embodiment of the present invention, there is provided a system for managing a storage system, comprising: one or more processors; a memory coupled to at least one processor of the one or more processors; computer program instructions stored in the memory which, when executed by the at least one processor, cause the system to execute a method for managing a storage system. The method comprising: in a storage system comprising a first controller, a second controller, a first communication area as well as a second communication area, with respect to a storage device in the storage system, in response to the first controller successfully accessing the storage device, writing to the first communication area a first state that indicates a state relationship between the first controller and the storage device, the first communication area being readable and writable to the first controller and readable to the second controller; reading from the second communication area a second state that indicates a state relationship between the second controller and the storage device, the second communication area being readable to the first controller and readable and writable to the second controller; and initializing the storage system in response to the second state indicating that the second controller successfully accesses the storage device.

In one embodiment of the present invention, the method further comprises: in response to the first controller successfully initializing the storage device, setting a first heartbeat timer in the first communication area; and periodically reading the second state from the second communication area before the first heartbeat timer expires.

In one embodiment of the present invention, the method further comprises: resetting the first communication area in response to the first heartbeat timer expiring.

In one embodiment of the present invention, the storage system is a Redundant Array of Independent Disks including a plurality of storage devices, and the method further comprises: with respect to each of the plurality of storage devices, initializing the storage system in response to the second state, associated with the each storage device, indicating the second controller successfully accesses the each storage device.

In one embodiment of the present invention, the first communication area crosses respective storage areas in the plurality of storage devices, and the initializing the storage system comprises: setting the first state associated with one storage device of the plurality of storage devices as "recovering," and setting the first state associated with other storage device of the plurality of storage devices as "active;" recovering, based on data in the other storage device whose first state is "active," data in the storage device whose first state is "recovering;" and updating the first state from "recovering" to "active."

In one embodiment of the present invention, the recovering, based on data in the other storage device whose first state is "active," data in the storage device whose first state is "recovering" comprises: locking a storage area across the plurality of storage devices; and in the storage area, recovering data in the storage device whose first state is "recovering," based on data in the other storage device whose first state is "active."

In one embodiment of the present invention, the locking a storage area across the plurality of storage devices comprises: writing to the first communication area a first lock flag associated with the storage area; reading from the second communication area a second lock flag associated with the storage area; and in response to the second lock flag indicating the storage area is not locked by the second controller, locking the storage area by the first controller.

In one embodiment of the present invention, the method further comprises: in response to the first state indicating the first controller cannot access an offline storage device among the plurality of storage devices, in response to the first controller receiving a write request, writing data associated with the write request to an online storage device that is accessible to the first controller; and writing a notification message to the first communication area to notify the second controller to synchronize data from the online storage device to the offline storage device.

In one embodiment of the present invention, the method further comprises: in response to the second controller reading the notification message from the first communication area, calculating parity data based on data associated with the write request and written to the online device; and writing the parity data to the offline device.

In one embodiment of the present invention, the method further comprises: in response to one storage device among the plurality of storage devices failing, adding a backup storage device to the storage system and updating the first state associated with the backup storage device as "recovering;" recovering data in the storage device whose first state is "recovering," based on data in the other storage device whose first state is "active;" and updating the first state associated with the backup storage device from "recovering" to "active."

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for managing a storage system, the storage system comprising a first controller, a second controller, and a plurality of storage devices configured as a redundant array of independent disks (RAID), the method comprising: with respect to a storage device in the storage system,
   in response to the first controller successfully accessing the storage device, writing to a first communication area a first state that indicates a state relationship between the first controller and the storage device, the first communication area being deployed across the RAID such that state data including the first state is recoverable in the event of failure of one of the storage devices, the first communication area being readable and writable to the first controller and readable to the second controller;
   reading from a second communication area a second state that indicates a state relationship between the second controller and the storage device, the second communication area being deployed across the RAID such that the state data including the second state is recoverable in the event of failure of one of the storage devices, the second communication area being readable to the first controller and readable and writable to the second controller; and
   in response to the second state, indicating that the second controller successfully accesses the storage device, initializing the storage system.

2. The method according to claim 1, further comprising:
   in response to the first controller successfully initializing the storage device, setting a first heartbeat timer in the first communication area; and
   periodically reading the second state from the second communication area before the first heartbeat timer expires.

3. The method according to claim 2, further comprising: resetting the first communication area in response to the first heartbeat timer expiring.

4. The method according to claim 1, wherein the method further comprises: with respect to each of the plurality of storage devices,
   initializing the storage system in response to the second state, associated with the each storage device, indicating the second controller successfully accesses the each storage device.

5. The method according to claim 4, wherein the initializing the storage system comprises:
   setting the first state associated with one storage device of the plurality of storage devices as "recovering," and setting the first state associated with other storage device of the plurality of storage devices as "active;"
   recovering, based on data in the other storage device whose first state is "active," data in the storage device whose first state is "recovering;" and
   updating the first state from "recovering" to "active".

6. The method according to claim 5, wherein the recovering, based on data in the other storage device whose first state is "active," data in the storage device whose first state is "recovering" comprises:
   locking a storage area across the plurality of storage devices; and
   in the storage area, recovering data in the storage device whose first state is "recovering," based on data in the other storage device whose first state is "active".

7. The method according to claim 6, wherein the locking the storage area across the plurality of storage devices comprises:
   writing to the first communication area a first lock flag associated, with the storage area;
   reading from the second communication area a second lock flag associated with the storage area; and in response to the second lock flag indicating the storage area is not locked by the second controller, locking the storage area by the first controller.

8. The method according to claim 5, further comprising:
in response to the first state indicating the first controller cannot access an offline storage device among the plurality of storage devices,
in response to the first controller receiving a write request, writing data associated with the write request to an online storage device that is accessible to the first controller; and
writing a notification message to the first communication area to notify the second controller to synchronize data from the online storage device to the offline storage device.

9. The method according to claim 8, further comprising:
in response to the second controller reading the notification message from the first communication area,
calculating parity data based on data associated with the write request and written to the online device: and
writing the parity data to the offline device.

10. The method according to claim 5, further comprising:
in response to one storage device among the plurality of storage devices failing, adding a backup storage device to the storage system and updating the first state associated with the backup storage device as "recovering:"
recovering data in the storage device whose first state is "recovering," based on data in the other storage device whose first state is "active;" and
updating the first state associated with the backup storage device from "recovering" to "active".

11. A system for managing a storage system, comprising:
one or more processors;
a memory coupled to at least one processor of the one or more processors:
computer program instructions stored in the memory which, when executed by the at least one processor, cause the system to execute a method for managing a storage system, the method comprising; in a storage system comprising a first controller, a second controller, and a plurality of storage devices configured as a redundant array of independent disks (RAID), with respect to a storage device in the storage system,
in response to the first controller successfully accessing the storage device, writing to a first communication area a first state that indicates a state relationship between the first controller and the storage device, the first communication area being deployed across the RAID such that state data including the first state is recoverable in the event of failure of one of the storage devices, the first communication area being readable and writable to the first controller and readable to the second controller;
reading from a second communication area a second state that indicates a state relationship between the second controller and the storage device, the second communication area being deployed across the RAID such that the state data including the second state is recoverable in the event of failure of one of the storage devices, the second communication area being readable to the first controller and readable and writable to the second controller; and
initializing the storage system in response to the second state indicating that the second controller successfully accesses the storage device.

12. The system according to claim 11, the method further comprising:
in response to the first controller successfully initializing the storage device, setting a first heartbeat, timer in the first communication area; and
periodically reading the second state from the second communication area before the first heartbeat timer expires.

13. The system according to claim 12, the method further comprising: resetting the first communication area in response to the first heartbeat timer expiring.

14. The system according to claim 11, wherein the method further comprises: with respect to each of the plurality of storage devices,
initializing the storage system in response to the second state, associated with the each storage device, indicating the second controller successfully accesses the each storage device.

15. The system according to claim 14, wherein the initializing the storage system comprises:
setting the first state associated with one storage device of the plurality of storage devices as "recovering," and setting the first state associated with other storage device of the plurality of storage devices as "active;"
recovering, based on data in the other storage device whose first state is "active," data in the storage device whose first state is "recovering;" and
updating the first state from "recovering" to "active".

16. The system according to claim 15, wherein the recovering, based on data in the other storage device whose first state is "active," data in the storage device whose first state is "recovering" comprises:
locking a storage area across the plurality of storage devices; and
in the storage area, recovering data in the storage device whose first state is "recovering," based on data in the other storage device whose first state is "active".

17. The system according to claim 16, wherein the locking the storage area across the plurality of storage devices comprises:
writing to the first communication area a first lock flag associated with the storage area;
reading from the second communication area a second lock flag associated with the storage area; and
in response to the second lock flag indicating the storage area is not locked by the second controller, locking the storage area by the first controller.

18. The system according to claim 15, wherein the method further comprises: in response to the first state indicating the first controller cannot access an offline storage device among the plurality of storage devices, in response to the first controller receiving a write request, writing data associated with the write request to an online storage device that is accessible to the first controller; and
writing a notification message to the first communication area to notify the second controller to synchronize data from the online storage device to the offline storage device.

19. The system according to claim 18, the method further comprising: in response to the second controller reading the notification message from the first communication area, calculating parity data based on data associated with the write request and written to the online device; and writing the parity data to the offline device.

20. The system according to claim 15, the method further comprising:

in response to one storage device among the plurality of storage devices failing, adding a backup storage device to the storage system and updating the first state associated with the backup storage device as "recovering;"

recovering data in the storage device whose first state is "recovering," based on data in the other storage device whose first state is "active;" and updating the first state associated with the backup storage device from "recovering" to "active".

* * * * *